US008723866B2

(12) United States Patent
Buyanovskiy

(10) Patent No.: US 8,723,866 B2
(45) Date of Patent: **\*May 13, 2014**

(54) METHOD AND SYSTEM FOR ADAPTIVE DIRECT VOLUME RENDERING

(75) Inventor: Georgiy Buyanovskiy, Cupertino, CA (US)

(73) Assignee: Fovia, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/276,067

(22) Filed: Oct. 18, 2011

(65) Prior Publication Data

US 2013/0314417 A1 Nov. 28, 2013

Related U.S. Application Data

(63) Continuation of application No. 11/827,921, filed on Jul. 12, 2007, now Pat. No. 8,040,350, which is a continuation of application No. 10/642,797, filed on Aug. 18, 2003, now abandoned.

(51) Int. Cl.
*G06T 15/50* (2011.01)

(52) U.S. Cl.
USPC .......................................................... 345/426

(58) Field of Classification Search
None
See application file for complete search history.

(56) References Cited

U.S. PATENT DOCUMENTS 6,028,608 A * 2/2000 Jenkins .......................... 345/619

OTHER PUBLICATIONS

A. Van Gelder, K. Kim, J. Wilhelms, "Hierarchically Accelerated Ray Casting for Volume Rendering with Controlled Error", Mar. 31, 1995, University of California at Santa Cruz, Technical Report.*
M. Shinya, T. Takahashi, S. Naito "Principles and Applications of Pencil Tracing", Jul. 1987, ACM, Computer Graphics, vol. 21, No. 4, pp. 45-54.*
Don P. Mitchell, "The Antialiasing Problem in Ray Tracing", Aug. 1990, ACM, SIGGRAPH '90 Course Notes, vol. 24.*
James Painter and Kenneth Sloan, "Antialiased Ray Tracing by Adaptive Progressive Refinement", Jul. 1989, ACM, Computer Graphics, vol. 23, No. 3, pp. 281-288.*
Lori A. Freitag and Raymond M. Loy, "Adaptive, Multiresolution Visualization of Large Data Sets using a Distributed Memory Octree", Nov. 19, 1999, ACM/IEEE Supercomputing 99 Conference.*
Levoy M: "Efficient Ray Tracing of Volume Data", ACM Transactions on Graphics (TOG), ACM, US, vol. 9, No. 3, Jul. 1, 1990, pp. 245-261, XP002913630, ISSN: 0730-0301, DOI: 10.1145/78964. 78965 *section 2*.

(Continued)

*Primary Examiner* — Ulka Chauhan
*Assistant Examiner* — Robert Bader
(74) *Attorney, Agent, or Firm* — Ward & Zinna, LLC

(57) ABSTRACT

An adaptive image volume rendering system first fragments a 3-D dataset into multiple sub-volumes and constructs an octree structure, wherein each sub-volume is associated with one node on the octree. The system then establishes a 2-D image plane and selectively launches a plurality of rays towards the 3-D dataset, each ray adaptively interacting with a subset of the sub-volumes. The ray energy reflected by each sub-volume is estimated using a modified Phong illumination model, constituting a pixel value at the ray origin on the 2-D image plane. Finally, the system interpolates pixel values at a plurality of selected locations and generates a 2-D image of the 3-D dataset.

14 Claims, 28 Drawing Sheets

(56) References Cited

OTHER PUBLICATIONS

Takaaki Akimoto et al: "Pixel-Selected Ray-Tracing", Systems & Computers in Japan, Wiley, Hoboken, NJ, US, vol. 18, No. 11, Nov. 1, 1987, pp. 41-49, XP000006630, ISSN: 0882-1666 *p. 42, right-hand colume* *figure 2*.

Arvo et al: "A Survey of Ray Tracing Acceleration Techniques", Introduction to Ray Tracing, Academic Press, London GB, Jan. 1, 1989, pp. 201-263, XP001247746, *abstract*.

Steven Schreiner and Robert L. Galloway; "A Fast Maximum-Intensity Projection Algorithm for Generating Magnetic Resonance Angiograms"; IEEE Transactions of Medical Imaging, vol. 12. No. 1, Mar. 1993, pp. 50-57.

Keun Ho Kim et al: "An Effective Preprocessing Method for Fast Hierarchical Maximum Intensity Projection"; Proceedings 2001 International Conference on Image Processing. ICIP 2001—Thessaloniki, Greece, vol. 1, Oct. 7, 2001—Oct. 10, 2001, pp. 850-853.

Csebfalvi B. et al.: "Fast Maxium Intensity Projection Using Binary Shear-Warp Factorization"; International Conference in Central Europe on Computer Graphics, Visualization and Interactive Digital Media. In Co-Operation With Eurographics and IFIP WG 5.10 WSCG, Feb. 8, 1999, pp. 47-54.

Danskin, John and Hanrahan, Pat: "Fast Algorithms for Volume Ray Tracing"; VVS '92 Proceedings of the 1992 Workshop on Volume Visualization, 1992, p. 91-98.

* cited by examiner

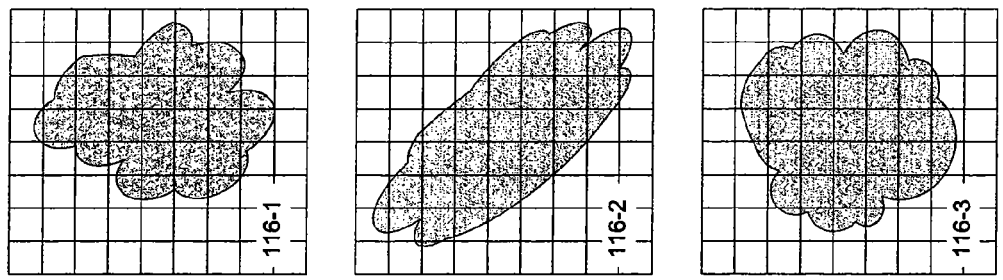
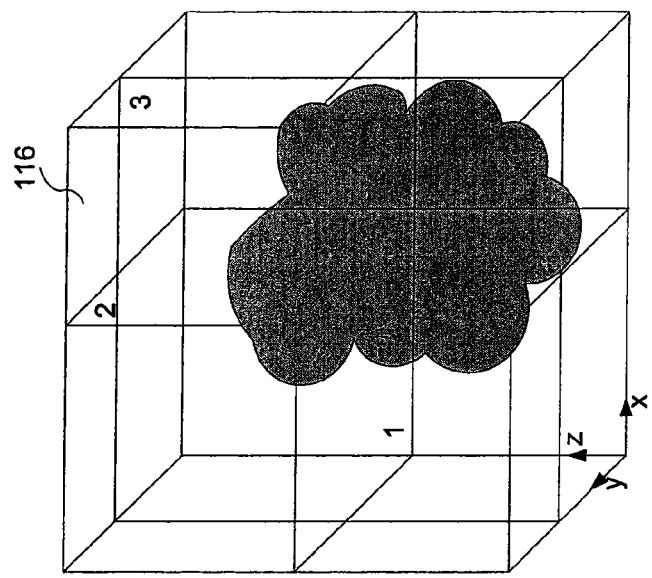
Fig. 1(D)
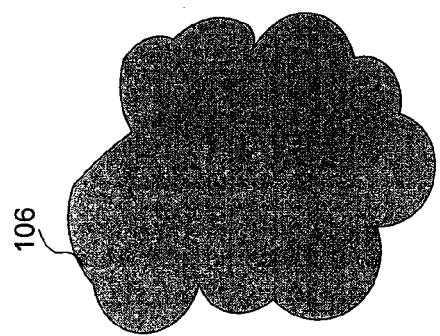

| Data Value 504 | Forward Lookup Value 506 | Back Lookup Value 508 |
|---|---|---|
| 0 | 10 | 0 |
| 1 | 9 | 1 |
| 2 | 8 | 2 |
| 3 | 7 | 3 |
| 4 | 6 | 4 |
| 5 | 5 | 5 |
| 6 | 4 | 6 |
| 7 | 3 | 7 |
| 8 | 2 | 0 |
| 9 | 1 | 1 |
| 10 | 0 | 2 |
| 11 | 6 | 3 |
| 12 | 5 | 4 |
| 13 | 4 | 0 |
| 14 | 3 | 1 |
| 15 | 2 | 2 |
| 16 | 1 | 3 |
| 17 | 0 | 4 |
| 18 | 3 | 5 |
| 19 | 2 | 6 |
| 20 | 1 | 7 |
| 21 | 0 | 0 |
| 22 | 4 | 1 |
| 23 | 3 | 2 |
| 24 | 2 | 0 |
| 25 | 1 | 1 |
| 26 | 0 | 2 |
| 27 | 3 | 3 |
| 28 | 2 | 4 |
| 29 | 1 | 5 |

METHOD AND SYSTEM FOR ADAPTIVE DIRECT VOLUME RENDERING

The present application is a continuation of application Ser. No. 11/827,921, filed Jul. 12, 2007, now U.S. Pat. No. 8,040,350 which application is a continuation of application Ser. No. 10/642,797, filed Aug. 18, 2003, now U.S. Pat. No. 7,301,538 B2, both of which applications are incorporated herein in their entireties.

FIELD OF THE INVENTION

The present invention relates generally to the field of volume data rendering, and more particularly, to a method and system for rendering a volume dataset using adaptive data representation, ray casting, and data interpolation techniques.

BACKGROUND OF THE INVENTION

Visualization of the internal structure of 3-D objects on a 2-D image is an important topic within the field of computer graphics and has been applied to many industries, including medicine, geoscience, manufacturing, and drug discovery.

For example, a CT scanner can produce hundreds or even thousands of parallel 2-D image slices of a patient's body including different organs, e.g., a heart, each slice including a 2-D array of data values and each data value representing a scalar attribute of the body at a particular location, e.g., density. All the slices are stacked together to form an image volume or a volumetric dataset of the patient's body with the heart embedded therein. A 2-D image showing the 3-D structural characteristics of the heart is an important aid in the diagnosis of cardiovascular disease.

As another example, the oil industry uses seismic imaging techniques to generate a 3-D image volume of a 3-D region in the earth. Some important geological structures, such as faults or salt domes, may be embedded within the region and not necessarily on the surface of the region. Similarly, a 2-D image that fully reveals the 3-D characteristics of these structures is critical in increasing oil production.

Direct volume rendering is a technique developed for visualizing the interior of a solid region represented by a 3-D image volume on a 2-D image plane, e.g., a computer monitor. Typically the scalar attribute or voxel at any point within the image volume is associated with a plurality of optical properties, such as color or opacity, which can be defined by a set of lookup tables. The 2-D image plane consists of a regularly spaced grid of picture elements or pixels, each pixel having red, green, and blue color components. A plurality of rays are cast from the 2-D image plane into the volume and they are attenuated or reflected by the volume. The amount of attenuated or reflected ray energy of each ray is indicative of the 3-D characteristics of the objects embedded within the image volume, e.g., their shapes and orientations, and further determines a pixel value on the 2-D image plane in accordance with the opacity and color mapping of the volume along the corresponding ray path. The pixel values associated with the plurality of ray origins on the 2-D image plane form an image that can be rendered on a computer monitor. A more detailed description of direct volume rendering is described in "Computer Graphics Principles and Practices" by Foley, Van Dam, Feiner and Hughes, 2nd Edition, Addison-Wesley Publishing Company (1996), pp 1134-1139.

Going back to the CT example discussed above, even though a doctor can arbitrarily generate 2-D image slices of the heart by intercepting the image volume in any direction, no single image slice is able to visualize the whole surface of the heart. In contrast, a 2-D image generated through direct volume rendering of the CT image volume can easily reveal the 3-D characteristics of the heart, which is very important in many types of cardiovascular disease diagnosis. Similarly in oil exploration, direct volume rendering of 3-D seismic data has proved to be a powerful tool that can help petroleum engineers to determine more accurately the 3-D characteristics of geological structures embedded in a region that are potential oil reservoirs and to increase oil production significantly.

Even though direct volume rendering plays a key role in many important fields, there are several technical challenges that need to be overcome to assure wide deployment of the direct volume rendering technique. First, direct volume rendering is a computationally expensive process. In order to produce a high quality 2-D image that can capture the 3-D characteristics of a 3-D target, direct volume rendering needs to process a large 3-D dataset, which usually means a large number of calculations. For example, it requires at least 140 million calculations to generate a 2-D image of $512^2$ pixels for a typical 3-D dataset of $512^3$ voxels using conventional direct volume rendering algorithms.

Moreover, many applications require that direct volume rendering of a 3-D dataset operate in real-time so that a user is able to view successive 2-D images of the 3-D dataset, each 2-D image having different viewing angles or visualization parameters, without a significant delay. In medical imaging, it is generally accepted that a sequential 2-D image rendering of at least six frames per second meets the need for real-time interactive feedback. This is equivalent to nearly 1 billion calculations per second.

Given the limited computational capacity of modern computers, more efficient algorithms have been developed to reduce the computational cost of direct volume rendering. However, many of these algorithms achieve their efficiency by sacrificing the quality of the generated 2-D images. For example, a common problem with discrete representation of a continuous object is the jitter effect, which is most obvious when a user zooms in to view more details of the continuous object. If the jitter effect is not carefully controlled, it may significantly corrupt the quality of an image generated by a direct volume rendering algorithm.

Therefore, it would be desirable to develop a new direct volume rendering method and system that increase the rendering efficiency while having less or preferably imperceptible impact on the image quality.

SUMMARY OF THE INVENTION

A preferred embodiment of the present invention is an adaptive direct volume rendering method and system that generate high-quality 2-D images of 3-D objects represented by a 3-D dataset using adaptive data representation, ray casting, and data interpolation techniques.

The method and system first fragment the 3-D dataset into multiple sub-volumes of different sizes and constructs a data structure, e.g., an octree, associating nodes of the octree with different sub-volumes of the dataset, each sub-volume also having a set of data value parameters characterizing the data value distribution within the sub-volume.

The method and system then cast a plurality of rays from a 2-D radiation plane towards the 3-D dataset. In one embodiment, commonly referred to as parallel projection, the plurality of rays are parallel to one other and each ray has its unique origin. In another embodiment, commonly referred to as perspective projection, the plurality of rays are all launched from the same origin and each ray forms a unique launching angle with respect to the 3-D dataset. Each ray, carrying an amount of initial energy and having a certain cross-section or ray thickness, interacts with a series of sub-volumes within the 3-D dataset along its path.

For each interaction between the ray and a sub-volume, a computation is performed in which the ray loses a fraction of its initial energy in accordance with a predefined opacity transfer function. The ray casting process continues through successive sub-volumes on the ray path until the ray's residual energy is below a predefined residual energy threshold or the ray has exited the dataset. Some of the lost ray energy is reflected towards a 2-D image plane in accordance with a predefined illumination model. Ray energy reflected by different sub-volumes is accumulated on selected locations of the 2-D image plane, producing an image of the 3-D objects embedded in the dataset.

To reduce the computational cost of ray casting, the method and system always attempt to choose a sub-volume of largest size that meets certain predefined conditions for interacting with a ray. One of the important conditions requires that the opacity transfer function vary monotonically within the sub-volume interacting with a ray. In one embodiment, the whole image volume associated with the root node of the octree is first selected for interacting with a ray. Since the opacity transfer function rarely varies monotonically within the entire image volume, the image volume is fragmented into smaller sub-volumes and one of the smaller sub-volumes that is closest to the ray origin along the ray path and associated with a child node of the root node is then tested to determine if it meets the predefined conditions. This fragmenting and testing process continues recursively until a sub-volume is found that meets all the conditions.

To quickly determine the opacity transfer function distribution within a sub-volume, two pre-built lookup, tables, a forward lookup table and a backward lookup table, are generated in association with the multiple local extrema of the opacity transfer function. Specifically, each entry of the forward lookup table contains the difference from a data value to the closest local extremum along the increasing direction and each entry of the backward lookup table contains the difference from a data value to the closest local extremum along the decreasing direction.

Once a sub-volume is finally chosen for interacting with a ray, a modified Phong illumination model is employed for calculating the amount of reflected ray energy. According to the modified Phong illumination model, the sub-volume is treated as a homogeneous body that has a constant opacity. Furthermore, a gradient of data value distribution within the sub-volume is estimated, representing the direction of a reflection surface within the sub-volume. The gradient forms an incident angle with the ray. Based on this information, it is easy to calculate reflected ray energy in accordance with the modified Phong illumination model.

In one embodiment, the 2-D radiation plane overlaps with the 2-D image plane and the selected locations are the origins of the plurality of rays. In this case, the calculation of reflected ray energy using the modified Phong illumination model is even more straightforward since the incident angle and the reflection angle is the same. As a result, ray energy reflected by a series of sub-volumes along each ray path is gathered as a pixel value at the ray origin on the 2-D radiation plane.

The computational cost and the image resolution of a direct volume rendering algorithm are determined primarily by the number of rays. Given a limited number of rays that can be handled by modern computer hardware within a reasonable time period, the method and system optimize the ray origins on the 2-D radiation plane such that the pixel values associated with those rays on the 2-D image plane can effectively capture the important 3-D characteristics of the 3-D objects embedded within the dataset.

In one embodiment, four rays are first launched from four corners of the 2-D radiation plane. After getting the four pixel values at the four corners of the 2-D image plane, the method and system check the variation of the values against a predefined imaging error threshold. If the variation is above the threshold, one more ray is launched from the center of the radiation plane, thereby dividing the 2-D radiation plane and the 2-D image plane into four sub-planes each. Variations of the pixel values within each sub-plane are further checked against the predefined imaging error threshold. Any sub-plane whose variation is above the threshold is further divided recursively until the variation of any sub-plane is below the threshold.

Finally, the method and system estimate a value at each pixel on the 2-D image plane that is not a ray origin based on the surrounding pixel values on the image plane. In one embodiment, those pixel values are a result of bi-linear interpolation of pixel values at the four corners of a smallest sub-plane that have met the predefined imaging error threshold.

BRIEF DESCRIPTION OF THE DRAWINGS

The aforementioned features and advantages of the invention as well as additional features and advantages thereof will be more clearly understood hereinafter as a result of a detailed description of preferred embodiments of the invention when taken in conjunction with the drawings.

FIG. 1(D) depicts a 3-D object represented in the form of a 3-D sampled dataset.

FIG. 5(B) illustrates two lookup tables associated with the opacity transfer function, a forward lookup table and a backward lookup table.

DESCRIPTION OF EMBODIMENTS

Figure 1A:
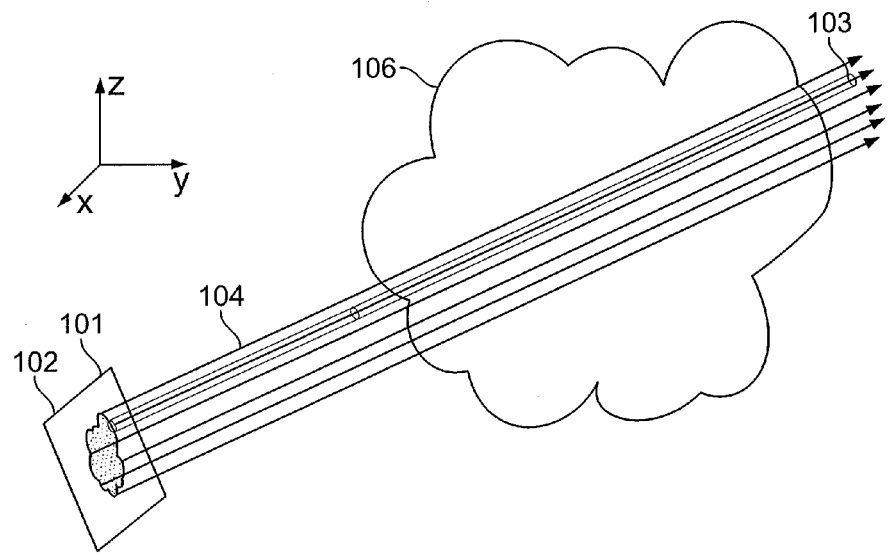
FIGS. 1(A) and 1(B) are two schematic illustrations useful in understanding a basic principle of direct volume rendering according to two embodiments of the present invention.
Figure 1B:
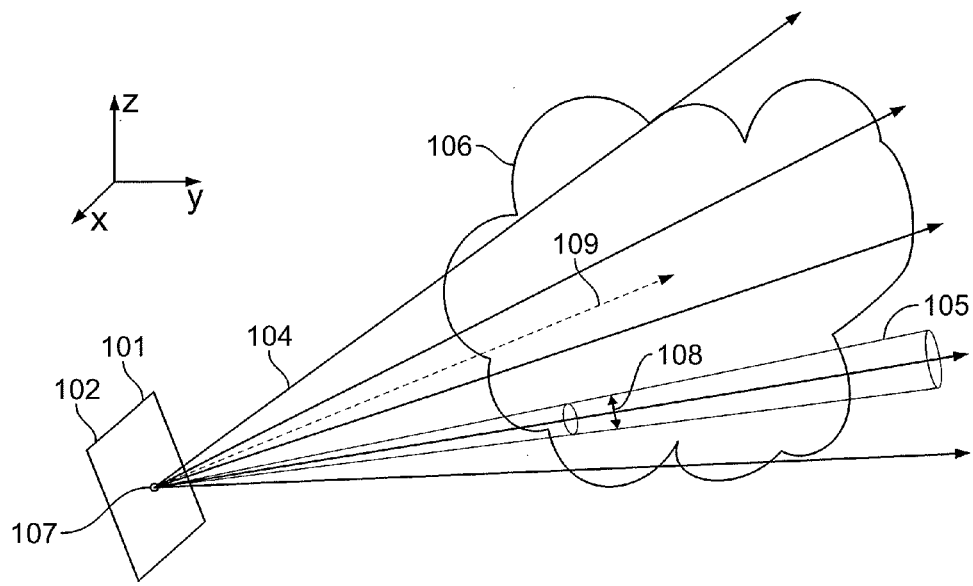

FIGS. 1(A) and 1(B) schematically illustrate the basic principle of direct volume rendering using the two embodiments of the present invention. In a 3-D domain represented by the Cartesian coordinates (x, y, z), there is an image volume 106 representing one or more 3-D objects. Direct volume rendering generates a 2-D image by casting a plurality of rays 104 into the image volume 106 and simulating the interactions between the rays and the image volume so as to visualize the 3-D characteristics of the 3-D objects. Note that the shape of a ray in the context of the present invention is not a 1-D line, but a 3-D tube or cone depending on different ray configurations discussed below.

In the embodiment shown in FIG. 1(A), the plurality of rays 104 are launched from different locations on a radiation plane 102, each ray traveling in parallel to another one towards the image volume 106. The shape of a ray is a tube 103 that has a cross-section of constant size, also referred to as ray thickness. Different rays correspond to different pixels on a 2-D image plane 101 that overlaps the 2-D radiation plane 102, and each pixel value is determined by the interaction between at least one ray and the image volume. Such ray configuration is called a parallel projection.

In the embodiment shown in FIG. 1(B), the plurality of rays 104 are launched from the same ray origin 107 on the radiation plane 102, each ray having a unique perspective angle with respect to the image volume 106. As a result, the shape of each individual ray is a cone 105 that has a cross-section of variable size along the ray path, and therefore the ray thickness is a function of both a viewing angle 108 and a distance 109 between the ray origin and the image volume. Similarly, different rays correspond to different pixels on the 2-D image plane 101, and each pixel value is determined by the interaction between at least one ray and the image volume. Such ray configuration is called a perspective projection.

Note that the radiation and image planes 102 and 101 overlap each other in the two embodiments discussed above. However, the same principle is still valid if the two planes are positioned at different locations. Therefore, it is straightforward for those skilled in the art to apply the teaching of the present invention in those cases. For simplicity, the following discussion will focus on the two embodiment shown in FIGS. 1(A) and 1(B).

Generally speaking, the image resolution of a 2-D image depends on the number of pixels per unit area. In practice, the total number of pixels per image is often a constant, e.g., $512^2$, which is dependent upon the number of pixels on a computer monitor. Therefore, higher image resolution in parallel projection is achieved by reducing the cross-section of a ray tube 103 and thereby increasing the number of pixels per unit area, and moving the radiation plane 102 along the ray paths away from or towards the image volume 106 does not affect the image resolution. In contrast, higher resolution in perspective projection is achieved by either reducing the viewing angle 108 or the distance 109 or both.

Figure 1C:
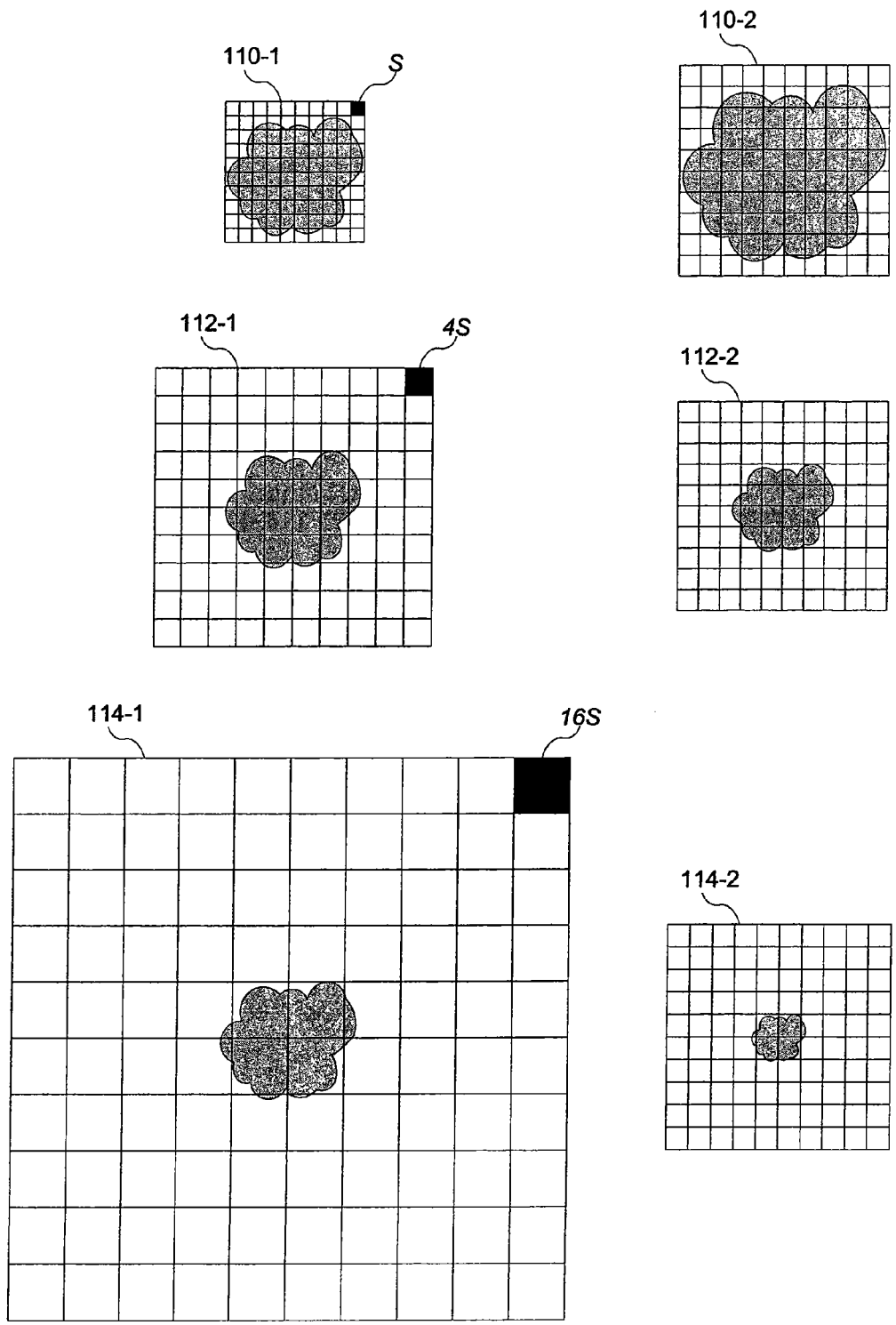
FIG. 1(C) depicts three images of a 3-D object at different image resolutions.

By way of example, FIG. 1(C) illustrates how the image resolution changes as a function of ray thickness. For simplicity, each image has only $10^2=100$ pixels. If the ray thickness of grid 110-1 is S, the ray thickness of grid 112-1 is 4S and the ray thickness of grid 114-1 is 16S, respectively. As a result, the image generated on grid 114-2 has the lowest resolution, and the image 110-2 generated on grid 110-2 has the highest resolution; and the image generated on grid 112-2 has intermediate resolution. Parallel projection achieves such magnification effect by reducing the size of the radiation plane and thereby increasing the density of ray origins per unit area on the plane; and perspective projection can achieve the same effect by moving the camera closer to the 3-D object in the image volume or changing the camera's perspective angle.

Each ray, carrying an amount of initial energy, interacts with a portion of the image volume 106 along its ray path. Depending on the different physical properties of the image volume, e.g., opacity, the ray may lose different amounts of ray energy when it travels through the image volume. For instance, the ray may not lose any energy if the opacity of the image volume 106 along the ray path is zero, or that portion of the image volume 106 is completely transparent; or all the ray energy may be reflected by a surface of the image volume 106 if the opacity of image volume 106 at the surface is one, or that portion of the image volume is completely opaque. A more common and complicated scenario is that during the course of interaction between the ray and the image volume, some of the ray energy is reflected by different objects embedded in the image volume 106 along the ray path and the ray comes out of the image volume 106 from the other side with a certain amount of residual energy. The accumulation of all the reflected energy at a point on the radiation plane 102 constitutes a pixel value at that ray origin. Therefore, all the pixel values on the radiation plane 102 constitute an image of the 3-D object embedded within the image volume 106.

The image volume 106 is usually represented by a 3-D dataset 116 as shown in FIG. 1(D). Each voxel of the 3-D dataset is a scalar value indicative of at least one physical attribute of the image at a particular location in the image volume. As indicated in FIG. 1(D), the 3-D dataset 116 has three orthogonal coordinates x, y and z. Along any coordinate, the dataset comprises a stack of 2-D data slices oriented perpendicular to that direction. Each data slice is a 2-D array of voxel data values on a regular grid along the other two coordinates. For example, the three orthogonal data slices 116-1, 116-2 and 116-3 perpendicular to the directions z, x, and y, respectively, provide three different and limited perspectives of image volume 106.

Figure 2:
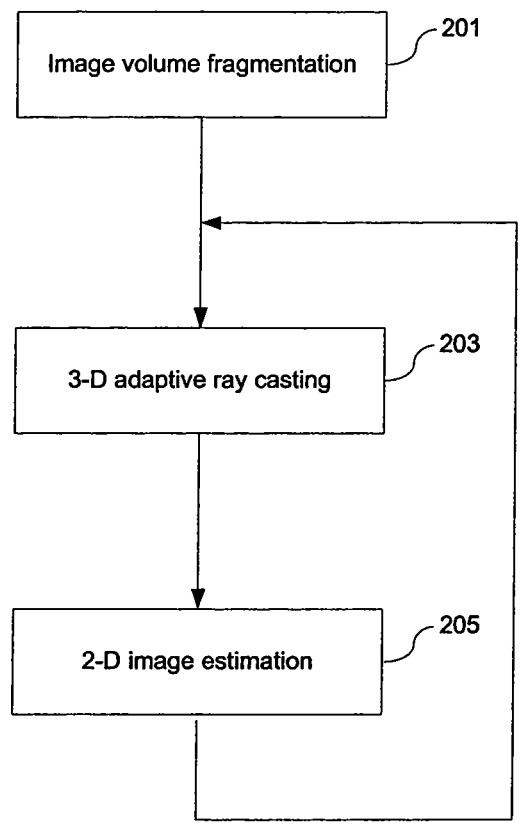
FIG. 2 is a flowchart depicting a direct volume rendering algorithm according to one embodiment of the present invention.

The direct volume rendering method of the present invention preferably comprises three major steps as shown in FIG. 2. At step 201, the method first fragments an image volume into multiple sub-volumes of different sizes, each sub-volume being associated with a set of parameters characterizing the data distribution within the sub-volume.

At step 203, the method launches a plurality of rays towards the image volume from an image plane that is located a certain distance away from the image volume and oriented in a certain direction towards the image volume. Each ray carries a certain amount of ray energy and selectively interacts with a subset of the sub-volumes located along its ray path. The summation of ray energy reflected by the sub-volumes that interact with the ray in accordance with a set of predefined visualization parameters becomes the pixel value at the ray origin on the image plane. More details about the reflected ray energy calculation are provided below.

Finally, at step 205, the method estimates the pixel value at any location on the image plane that is not a ray origin and produces a 2-D image visualizing the 3-D characteristics of the image volume as viewed from the image plane's location and direction. Steps 203 and 205 may be repeated to generate a series of new images when the image plane's location or direction changes or different visualization parameters are applied.

Image volume fragmentation. According to one embodiment of the present invention, an image volume is first fragmented into a set of sub-volumes. Each sub-volume is further fragmented into even smaller sub-volumes. Such recursive fragmentation continues until the smallest sub-volumes reach a predefined size limit. Finally, all the sub-volumes are associated with a data structure to form a new representation of the original image volume.

Figure 3A:
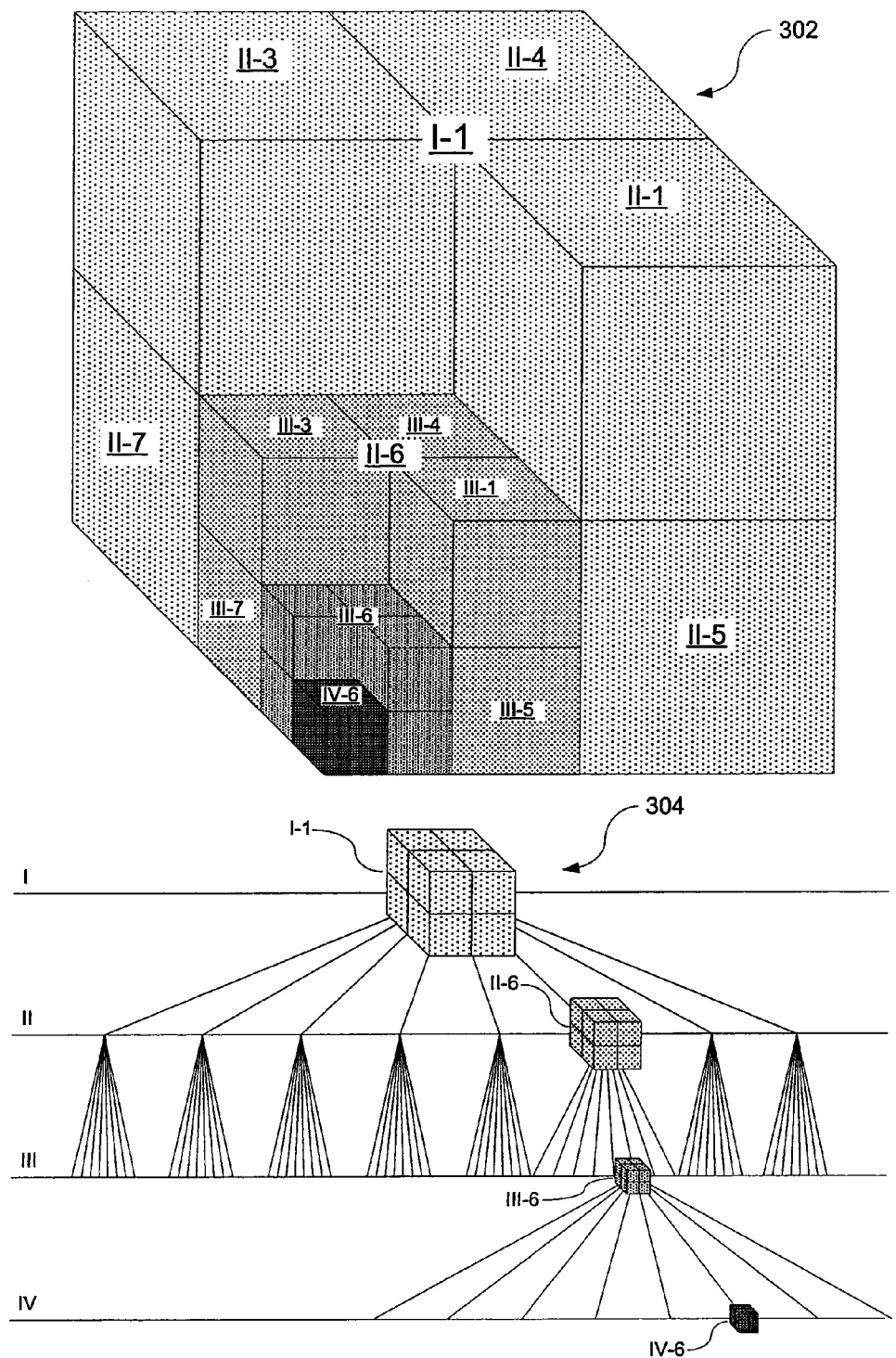
FIG. 3(A) depicts one particular embodiment of a 3-D dataset fragmentation.

FIG. 3(A) depicts one instance of the fragmentation of a 3-D dataset 302 into a plurality of sub-volumes, in this case into 585 sub-volumes. These 585 sub-volumes belong to four fragmentation levels I, II, III, and IV. For illustrative purposes, several sub-volumes of different sizes, e.g., II-2, III-2 and IV-2, have been removed from dataset 302 of FIG. 3(A) so as to expose other sub-volumes of smaller sizes. Each of the 585 sub-volumes is associated with one node of an octree data structure 304 based on its size. To simplify the illustration, only a subset of the sub-volumes are shown in the octree 304 of FIG. 3(A).

Starting from fragmentation level I, the whole dataset 302 is treated as one sub-volume I-1 and associated with the root node of octree 304. At fragmentation level II, dataset 302 is partitioned into eight sub-volumes of the same size; and each sub-volume, e.g., II-6, is associated with one intermediate node of octree 304 at level IL Further, at fragmentation level III, each sub-volume such as sub-volume II-6 is divided into eight sub-volumes III-1, III-2, . . . , and III-8; and similarly, each sub-volume like III-6 is associated with an intermediate node at level III. Finally, at fragmentation level IV, each sub-volume, such as sub-volume is partitioned into another eight sub-volumes (including sub-volume IV-6); and each sub-volume at level N is associated with a leaf node of octree 304. Since there are $8^0$ sub-volumes at level I, $8^1$ sub-volumes at level II, $8^2$ sub-volumes at level III, and $8^3$ sub-volumes at level IV, the dataset 302 is fragmented into at total of $$8^0 + 8^1 + 8^2 + 8^3 = 1 + 8 + 64 + 512 = 585$$

sub-volumes at different fragmentation levels.

Each sub-volume is associated with a set of parameters characterizing the data distribution in this sub-volume. In one embodiment, the set of parameters includes three elements:

$V_{min}$ representing the minimum value of image data within the sub-volume;

$V_{avg}$ representing the average value of image data within the sub-volume; and $V_{max}$ representing the maximum value of image data within the sub-volume.

As demonstrated in FIG. 3(A), the image volume fragmentation is a recursive process. This fragmentation process does not stop until the smallest sub-volumes reach a predefined size limit. In one embodiment, this predefined size limit or the smallest sub-volume associated with an octree leaf node is a sub-volume comprising 2×2×2 cells or voxels in the image dataset. A cell or voxel is the smallest unit in the image dataset that is associated with some data values of the image volume. For example, if the image dataset has $512^3$ cells which is typical in direct volume rendering and the smallest sub-volume has 2×2×2 cells, the volume fragmentation process continues to fragmentation level IX and the number of smallest sub-volumes is $256^3$.

Figure 3B:
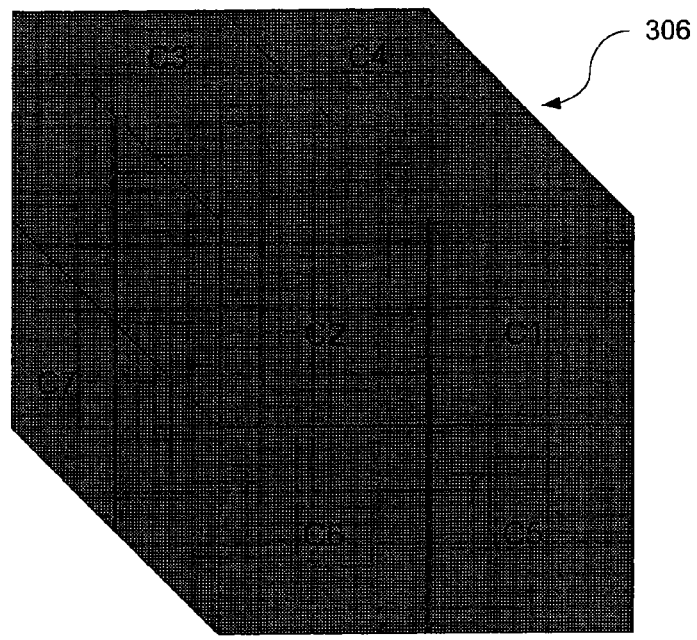
FIG. 3(B) depicts a sub-volume comprising eight cells or voxels and scalar field distribution within a voxel or a cell.
Figure 3B:
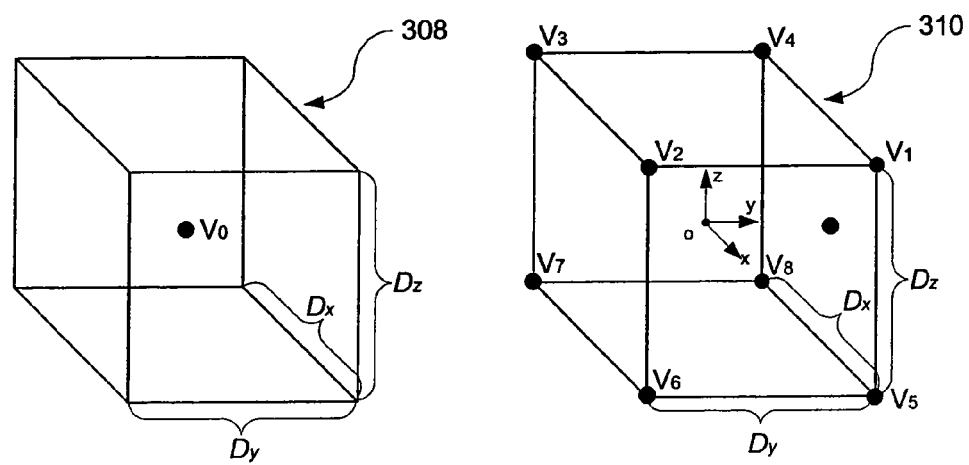

FIG. 3(B) shows the eight cells or voxels of a sub-volume 306 arranged such that there are two cells or voxels next to each other in each of the three orthogonal directions. A voxel 308 is a cube that is centered at one sampled data value, e.g., $V_0$. The data value within a voxel is preferably constant and therefore there may be a discontinuity of data value across a voxel boundary. In contrast, a cell 310 is a cube of the same size that has eight sampled data values $V_1$-$V_8$, one at each of the eight corners of the cube. In one embodiment of the present invention, the data value at any point within the cell is approximated by tri-linear interpolation and the data value varies continuously across a cell boundary.

Assuming that there is a 3-D Cartesian coordinate system with its origin at the center of cell 310 and the lengths of the cell's three edges are $D_x$, $D_y$, and $D_z$ respectively, the data value of any point V(x,y,z) within the cell can be expressed as a function of the data values at the eight corners of the cell, $V_1$-$V_8$, as follows:

$$V(x, y, z) = \frac{V_1}{8}\left(1 + \frac{2x}{D_x}\right)\left(1 + \frac{2y}{D_y}\right)\left(1 + \frac{2z}{D_z}\right) + \frac{V_2}{8}\left(1 + \frac{2x}{D_x}\right)\left(1 - \frac{2y}{D_y}\right)\left(1 + \frac{2z}{D_z}\right) + \\ \frac{V_3}{8}\left(1 - \frac{2x}{D_x}\right)\left(1 - \frac{2y}{D_y}\right)\left(1 + \frac{2z}{D_z}\right) + \frac{V_4}{8}\left(1 - \frac{2x}{D_x}\right)\left(1 + \frac{2y}{D_y}\right)\left(1 + \frac{2z}{D_z}\right) + \\ \frac{V_5}{8}\left(1 + \frac{2x}{D_x}\right)\left(1 + \frac{2y}{D_y}\right)\left(1 - \frac{2z}{D_z}\right) + \frac{V_6}{8}\left(1 + \frac{2x}{D_x}\right)\left(1 - \frac{2y}{D_y}\right)\left(1 - \frac{2z}{D_z}\right) + \\ \frac{V_7}{8}\left(1 - \frac{2x}{D_x}\right)\left(1 - \frac{2y}{D_y}\right)\left(1 - \frac{2z}{D_z}\right) + \frac{V_8}{8}\left(1 - \frac{2x}{D_x}\right)\left(1 + \frac{2y}{D_y}\right)\left(1 - \frac{2z}{D_z}\right).$$

It is apparent to those skilled in the art that the present invention applies equally to image volumes represented in either format, cell or voxel. For simplicity, the following discussion focuses on the cell representation as an example.

The choice of the size of the smallest sub-volumes is a compromise between the efficiency, accuracy and computational cost of a direct volume rendering algorithm. In general, if the size of the smallest sub-volumes increases, fewer computer resources such as memory are needed for direct volume rendering and the corresponding image rendering speed, or frames per second (FPS), increases but at the cost of lower image resolution. On the other hand, if the size of the smallest sub-volumes decreases to the level of a single cell, thereby achieving higher image resolution, the memory used for allocating the corresponding octree will be eight times the memory used for allocating octree 304 of FIG. 3(A).

Figure 4:
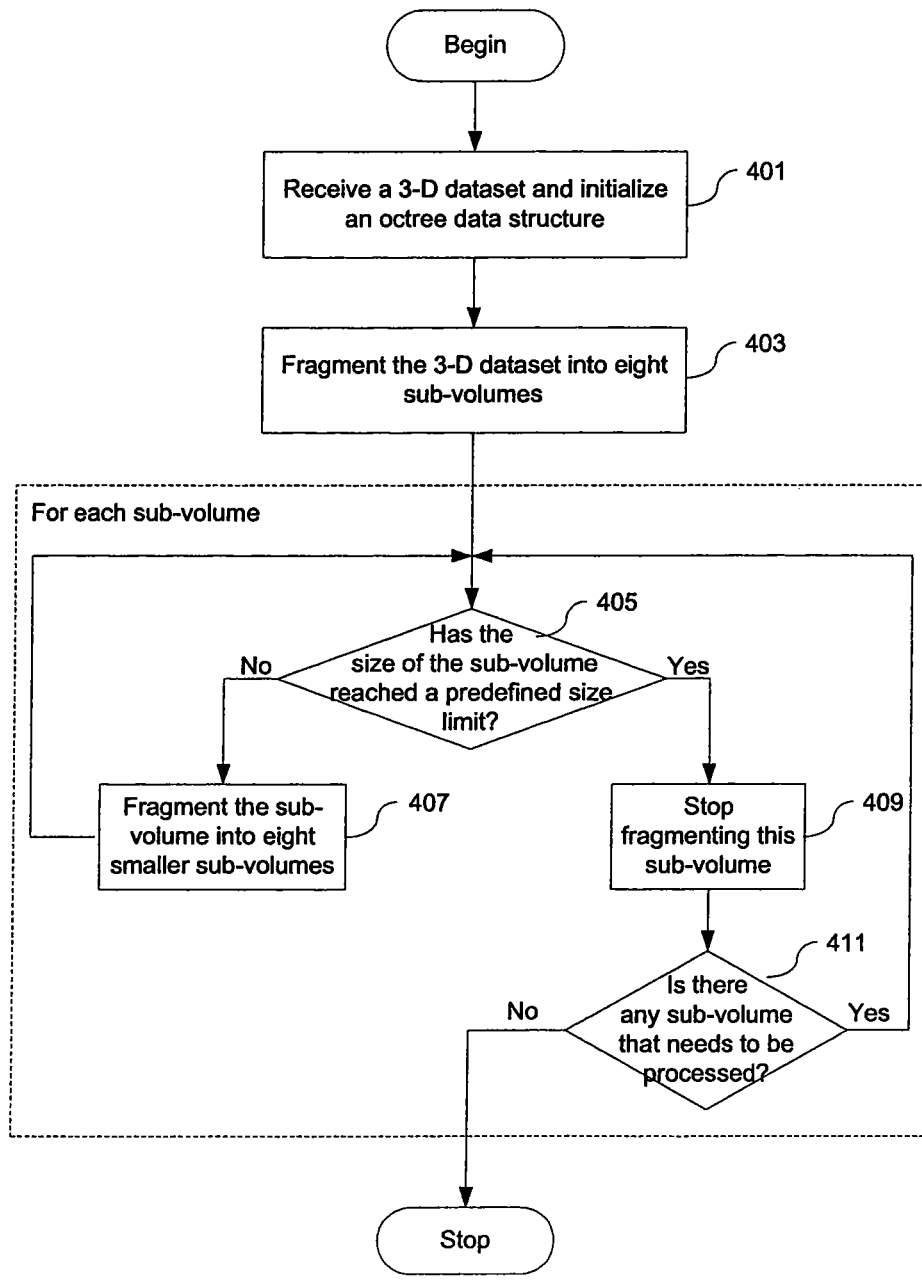
FIG. 4 is a flowchart illustrating a computer implementation of a 3-D dataset fragmentation.

FIG. 4 is a flowchart summarizing a computer program for image volume fragmentation as well as octree construction discussed above. At step 401, the computer program receives a 3-D dataset and initializes an octree data structure by associating the 3-D dataset with the root node of the octree. At step 403, the dataset is fragmented into eight sub-volumes and eight new child nodes are generated for the root node such that each sub-volume is associated with one child node of the root node.

Starting from step 405, each sub-volume is recursively fragmented into smaller sub-volumes until the smallest sub-volumes reach the predefined size limit. At step 405, the computer program first checks if the size of a sub-volume reaches a predefined size limit, e.g., a sub-volume of 2×2×2 cells. If not, at step 407, the sub-volume is fragmented into eight smaller sub-volumes. One of the eight smaller sub-volumes is picked and the recursive fragmentation starts at step 405 again.

If the size of a sub-volume has reached a predefined size limit, e.g., 2×2×2 cells, the computer program stops fragmenting this sub-volume at step 409 and the corresponding node of the octree associated with the sub-volume is one of the leaf nodes of the octree. At step 411, the computer program checks if there are other sub-volumes that have not been fragmented to 2×2×2 cells. If true, one of those sub-volumes is selected and the recursive fragmentation also starts at step 405 again. Otherwise, the image volume fragmentation is over.

As discussed above, each sub-volume is associated with a set of parameters such as ($V_{min}$, $V_{avg}$, $K_{max}$) used for calculating a pixel value on the 2-D image plane. In one embodiment, this calculation is separated from the recursive image volume fragmentation discussed above to benefit from the fragmented representation of an image volume such as octree 304 in FIG. 3(A). For example, after a 3-D dataset has been fragmented and an octree has been constructed, the computer starts from the leaf node level of the octree, calculating the corresponding $V_{min}$, $K_{avg}$, and $V_{max}$ for a sub-volume associated with a leaf node, such as sub-volume IV-6 in FIG. 3A. Since each sub-volume associated with a leaf node only comprises eight cells and each cell has eight data values, most of which are shared by two or more cells, the computer only needs to retrieve 27 voxel data values from a computer storage device such as a hard disk to calculate ($K_{min}$, $V_{avg}$, $V_{max}$) of the sub-volume.

After processing all the sub-volumes at leaf node level, the computer program moves one level up along octree 304 to calculate the corresponding parameters for a sub-volume like III-6 that is associated with an intermediate node. And it continues moving up along octree 304 until it reaches the root node. Since each intermediate node has eight child nodes and each child node is associated with a sub-volume whose parameters have been determined in the previous step, each data value parameter of this intermediate node can be easily expressed as a function of eight parameters associated with the eight child nodes:

$$V_{min} = \text{Min}(V_{min\_1}, V_{min\_2}, \ldots, V_{min\_8});$$

$$V_{avg} = (V_{avg\_1} + V_{avg\_2} + \ldots + V_{avg\_8})/8; \text{ and}$$

$$V_{max} = \text{Max}(V_{max\_1}, V_{max\_2}, \ldots, V_{max\_8}).$$

As will be apparent, this generation of data value parameters proceeds in a direction opposite to the octree construction which starts at the root node level and moves downward until the leaf node level as shown in FIG. 3(A). This bottom-up approach for data value parameter generation is most efficient since it maximally reuses calculation results at a lower level of the octree.

At the end of step 201, a new representation of the original image volume is available for step 203 of the direct volume rendering method. This representation includes an octree, a plurality of sub-volumes of different sizes, each sub-volume associated with one node of the octree and having a set of data value parameters characterizing the data distribution within the sub-volume.

3-D Adaptive Ray Casting. As shown in FIG. 1, in order to generate a 2-D image 108 of an image volume 106, a 2-D image plane 102 is first defined in the proximity of the image volume (or maybe within the image volume) and then a plurality of rays 104 are assumed to be launched from the 2-D image plane 102 towards the image volume 106. The basic idea of ray casting is to simulate a physical process such as a light ray penetrating a 3-D object. In the real world, due to interaction between the light ray and the 3-D object, one portion of the light ray energy is reflected back to the light ray origin, one portion is scattered in all directions, one portion is absorbed and the residual energy is transmitted through the object. The summation of all reflected energy associated with multiple light rays launched from different locations (parallel projection) or the same location (perspective projection) on the image plane provides an image of the 3-D object. In other words, the reflected energy, to a certain degree, reflects the object's visual properties, e.g., its hue and brightness. Different parts of a 3-D object may reflect different amount of ray energy, depending on the object's optical attributes, such as opacity, emissivity, color, etc, as well as its geometrical properties, such as shape and orientation.

The present invention includes a numerical algorithm for simulating the physical process discussed above. First, the algorithm constructs a mathematical model for a ray having a certain amount of initial ray energy and a cross-section, and represents a 3-D object as a discrete 3-D dataset, each element of the dataset characterizing a certain physical property at a particular location of the object according to a predefined transfer function, e.g., an opacity transfer function that determines the amount of ray energy lost during the interaction between the ray and the 3-D object. Second, the algorithm simulates the physical interactions between the ray and different locations of the object along the ray path using numerical analysis. Specifically, the algorithm calculates the ray energy reflected by a location along the ray path based upon the corresponding elements in the 3-D dataset and a theoretical illumination model. Finally, the algorithm accumulates the ray energy reflected by different locations at a particular pixel on an image plane and translates the reflected ray energy into a color value. In one embodiment, the origin of the ray is selected as the particular pixel and the pixel value comprises three components, red, green, and blue.

In direct volume rendering, there can be multiple transfer functions associated with a 3-D dataset. The opacity transfer function discussed above is one of the most important, because opacity plays an essential role in determining how intelligible and informative the final rendering will be. Contrary to the real world in which the opacity of an object is usually fixed, the opacity transfer function in direct volume rendering can be chosen arbitrarily. An important advantage of having an arbitrary opacity transfer function is that different opacity transfer functions when applied to a same 3-D dataset may reveal different characteristics of the dataset.

Figure 5A:
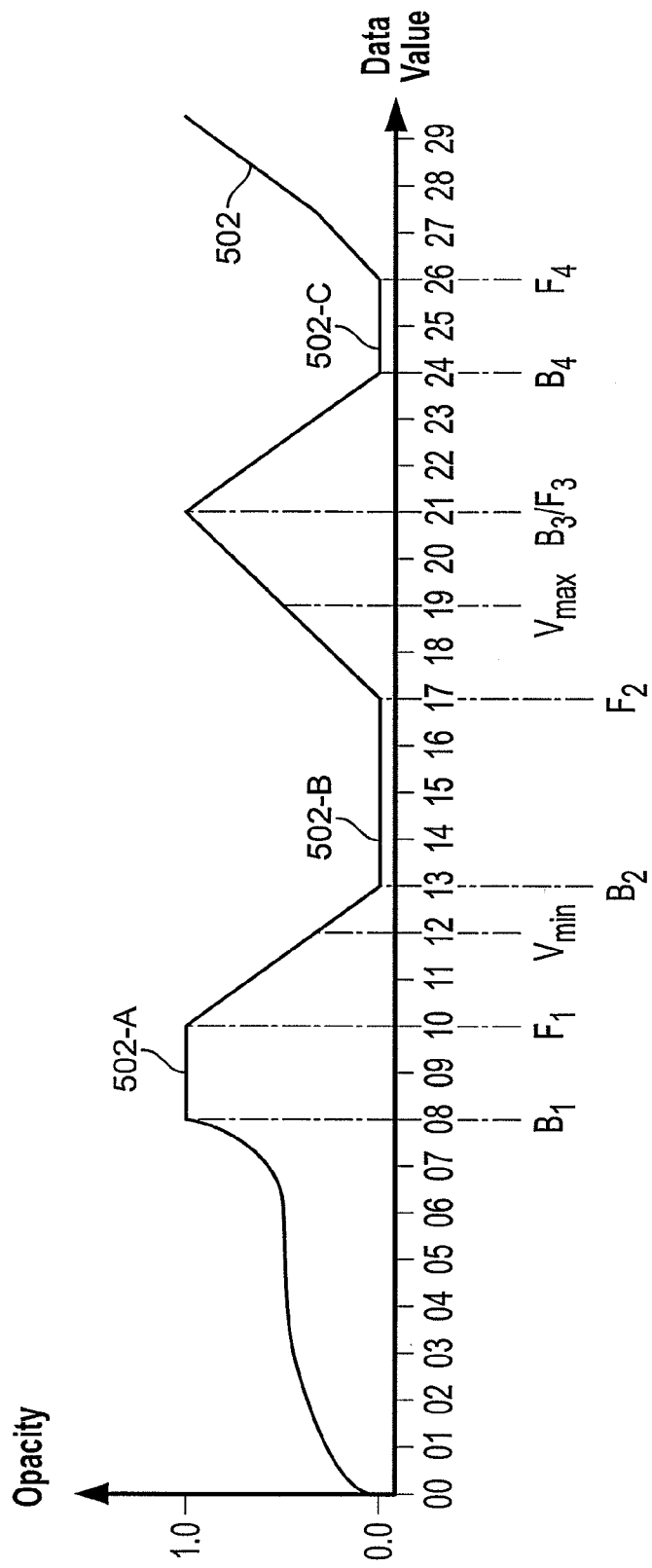
FIG. 5(A) illustrates an opacity transfer function used in direct volume rendering.

FIG. 5(A) is an example of an opacity transfer function that may be used in direct volume rendering. The vertical axis is opacity scaled from 0.0 to 1.0 and the horizontal axis is the magnitude of a data value in a 3-D dataset. Opacity curve 502 varies between 0.0 and 1.0 as a function of data value, thereby relating a magnitude of a data value to an opacity level. By way of example, any data value having a magnitude between 8 and 10 has an opacity value of 1.0, as indicated by section 502-A of the opacity curve. Portions of the 3-D dataset having such data value are treated as completely opaque and no ray can penetrate such portions with any residual ray energy. Similarly, any data value having a magnitude between 13 and 17 or between 24 and 26 has an opacity value of 0.0, as indicated by sections 502-B and 502-C. Portions of the 3-D dataset having such data value are treated as transparent and there is no ray energy loss when a ray passes through such portions of the 3-D dataset. FIG. 5(B) depicts two lookup tables in response to the opacity transfer function shown in FIG. 5(A), a forward lookup table (FLT) 506 and a backward lookup table (BLT) 508. These two tables are used to quickly determine if a sub-volume interacts with a ray or not. The specific functions of these two tables are discussed in more detail below.

Figure 6:
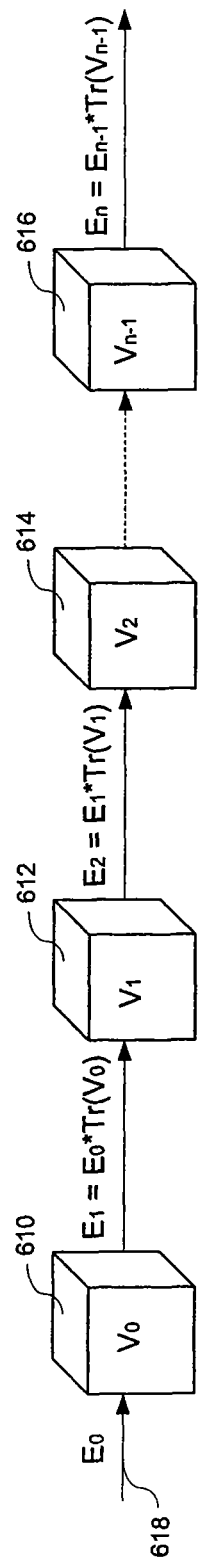
FIG. 6 illustrates ray energy loss due to the interactions between a ray and a series of sub-volumes.

FIG. 6 illustrates a series of interactions between a ray and a series of sub-volumes in a 3-D dataset. For simplicity, assume that boxes 610-616 represent n sub-volumes adjacent to each other. Each sub-volume has the same physical dimension and a unique data value $V_n$. A ray 618 having an initial energy $E_0$ enters a sub-volume 610 on the perpendicular to one side and exits from an opposite side, and immediately enters next sub-volume 612 until it emerges out of the last sub-volume 616. When the ray exits sub-volume 610 from its right side, the ray's residual energy is estimated to be $$E_1 = E_0 \cdot (1 - Op(V_p)) = E_0 \cdot Tr(i\, V_0),$$

where $Op(V)$ is an opacity transfer function, such as curve 502 shown in FIG. 5(A), and $Tr(V)$ is complementary to $Op(V)$, also referred to as transparency transfer function. Therefore, the lost energy when the ray penetrates sub-volume 510 is the difference between the initial energy and the residual energy $$\tilde{E}_0 = E_0 - E_1.$$

Similarly, right after leaving sub-volume 516, the residual ray energy is $$E_n = E_{n-1} \cdot Tr(V_{n-1}),$$

and the lost ray energy is $$\tilde{E}_{n-1} = E_{n-1} - E_n.$$

As indicated above, not all energy lost during the course of interaction between a ray and a sub-volume is reflected back to the ray origin. Many illumination models have been developed in computer graphics. In the present invention, a modified version of the well-known Phong illumination model is used for calculating the ray energy reflected back to the ray origin when a ray interacts with a sub-volume.

The Phong illumination model takes into account three types of reflected light from a surface. They are:
Ambient reflection $E_a$, which is the reflection of light which arrives at a surface from all directions;
Diffuse reflection $E_d$, which is the reflection of light from a non-shiny surface that scatters in all directions; and
Specular reflection $E_s$, which is the reflection of light from a mirror-like surface that reflects incident light in one particular direction.

Figure 7:
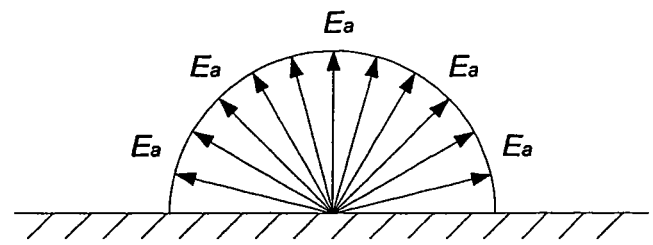
FIGS. 7(A)-7(C) depict three types of reflections according to a Phong illumination model, ambient reflection, diffuse reflection and specular reflection.
Figure 7:
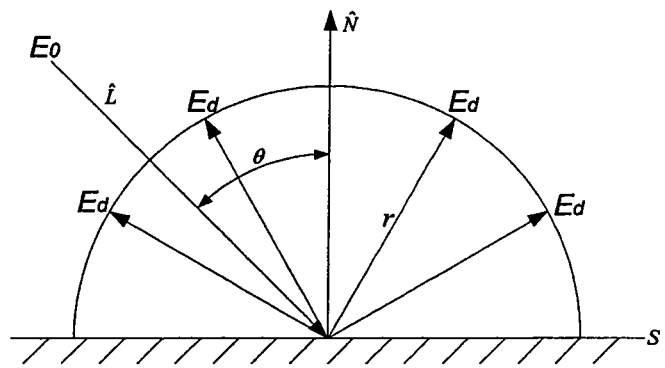
Figure 7:
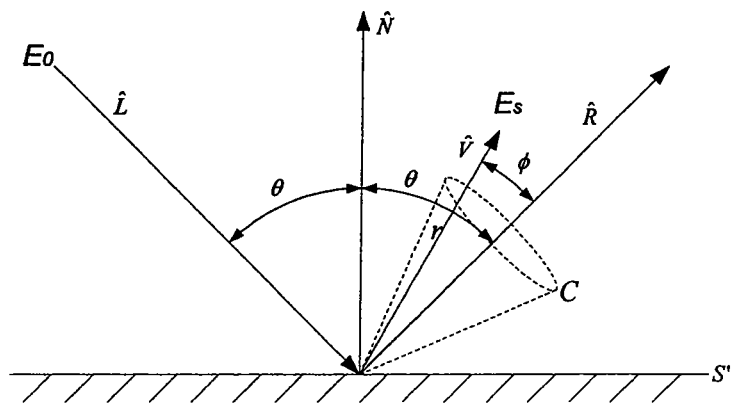

FIG. 7(A) depicts ambient reflection $E_a$ which is a constant value in all directions.

FIG. 7(B) depicts diffuse reflection $E_d$. When light of energy $E_0$ impinges upon a non-shiny surface S with an incident angle $\theta$ formed between the light direction $\hat{L}$ and the surface direction if $\hat{N}$, the energy of diffusely reflected light $E_d$ in any direction can be estimated as $$E_d = \frac{E_0 \cos\theta}{r+k},$$

or $$E_d = \frac{E_0(\hat{L} \cdot \hat{N})}{r+k},$$

where r is the distance between the reflection point and the viewer's location and k is a constant chosen to avoid division overflow in computer implementation when r is too small.

FIG. 7(C) depicts specular reflection. When a light of energy $E_0$ impinges upon a mirror-like surface S' with an incident angle $\theta$ formed between the light direction $\hat{L}$ and the surface direction $\hat{N}$, almost all the energy is specularly reflected in direction $\hat{R}$ that forms a reflection angle $\theta$ with the surface direction $\hat{N}$. If the surface S' is a perfect mirror, the specular reflection can only be seen in direction $\hat{R}$. In the real world, a perfect mirror rarely exists and there is always a certain amount of light scattering around the reflection direction $\hat{R}$, as indicated by the dashed line cone C. An empirical estimate of specular reflection $E_s$ in direction $\hat{V}$ is:

$$E_d = \frac{E_0 \cos^n \phi}{r+k}$$

or $$E_d = \frac{E_0(\hat{R} \cdot \hat{V})^n}{r+k},$$

where n is a parameter indicative of the smoothness of the surface S'. For a glossy surface, n is set to a high value such as 128 to simulate the phenomenon that most of the energy reflected from a glossy surface is concentrated in direction $\hat{R}$ and specular reflection $E_s$ drops quickly as the angle $\phi$ increases; and for a matte surface, n is set to a low value such as 8, such that specular reflection $E_s$ drops at a relatively slower rate when the angle $\phi$ increases.

Combining ambient reflection $E_a$, diffuse reflection $E_d$, and specular reflection $E_s$, an estimate of total reflection according to the Phong illumination model is:

$$E = K_a E_a + K_d E_d + K_s E_s,$$

or $$E = K_a E_a + \frac{K_d E_0(\hat{L} \cdot \hat{N}) + K_s E_0(\hat{R} \cdot \hat{V})^n}{r+k},$$

where $K_a$, $K_d$, and $K_s$ are the coefficients of ambient reflection, diffuse reflection, and specular reflection of the surface respectively. Coefficient $K_s$ is usually a constant, and coefficients $K_a$ and $K_d$ are usually dependent upon the wavelength of incident light and the surface material.

In computer graphics, the color of an image is usually specified as a composition of three basic colors, red, green and blue. Therefore, in direct volume rendering, the total reflection ray energy E in the Phong illumination model can be decomposed into the following three components:

$$E_r = K_{ar}E_a + \frac{K_{dr}E_0(\hat{L}\cdot\hat{N}) + K_s E_0(\hat{R}\cdot\hat{V})^n}{r+k},$$

$$E_g = K_{ag}E_a + \frac{K_{dg}E_0(\hat{L}\cdot\hat{N}) + K_s E_0(\hat{R}\cdot\hat{V})^n}{r+k},$$

$$E_b = K_{ab}E_a + \frac{K_{db}E_0(\hat{L}\cdot\hat{N}) + K_s E_0(\hat{R}\cdot\hat{V})^n}{r+k},$$

where the specular reflection coefficient $K_s$ is the same for all colors while the ambient and diffuse reflection coefficients are a function of wavelength.

The original Phong illumination model assumes that the surface's direction $\hat{N}$ is known when estimating both diffuse reflection $E_d$ and specular reflection $E_s$. In direct volume rendering, the visualization target is usually a sampled 3-D scalar field that represents a continuous object, such as a heart or a geological fault. It is difficult to define the direction of an object's surface in such an image volume. As a result, a local gradient vector of the data value estimated at a sampled location is used as a substitute for surface direction in the modified Phong illumination model. There are many gradient vector estimation techniques known to those of ordinary skill in the art. In one embodiment, reflection coefficients, like an opacity transfer function, are defined as a function of data value. A user can adjust these coefficients to his liking.

Figure 8:
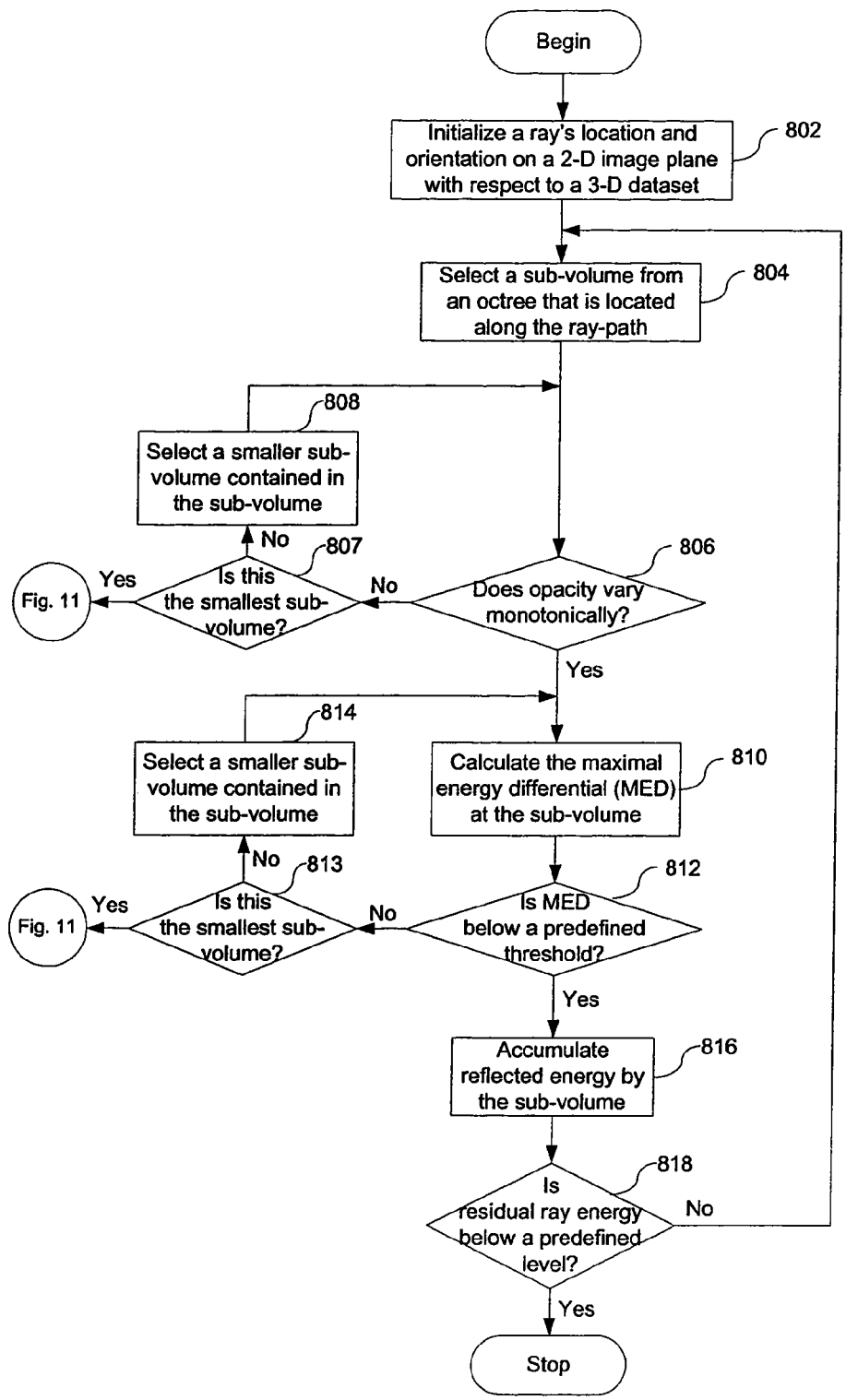
FIG. 8 is a flowchart depicting a computer program for estimating reflected ray energy according to an embodiment of the present invention.

FIG. 8 is a flowchart of the operation of a computer program that uses a user-defined opacity transfer function and a modified Phong illumination model to estimate reflected ray energy when a ray interacts with an image volume. Since the image volume has been fragmented into a plurality of sub-volumes associated with an octree as shown in FIG. 3(A), the interaction between the ray and the image volume turns into a series of interactions between the ray and some of the sub-volumes. Each interaction consumes a fraction of the ray energy, and some of the consumed energy may be reflected back to the ray origin on the image plane. The accumulation of reflected ray energy from the series of interactions constitutes a pixel value at the ray origin.

At step 802, the computer program initializes a ray by setting its initial energy to $E_0$ and specifying location and orientation on a 2-D image plane with respect to a 3-D dataset representing an image volume.

At step 804, the computer program selects a sub-volume of the 3-D dataset that is associated with one node of an octree to check if this sub-volume is qualified for reflected ray energy calculation. If the ray has, not interacted with any sub-volume, the largest sub-volume associated with the root node is first selected for this checking. If the ray has just interacted with one sub-volume, the next sub-volume of the same size along the ray path is selected for this checking. FIG. 9 below provides more details about this sub-volume selection strategy. To reduce imaging error, a sub-volume must pass two tests to be qualified for reflected ray energy calculation:

the opacity transfer function between $V_{min}$ and $V_{max}$ of this sub-volume should be monotonic; and the maximum energy differential (MED) of this sub-volume should be below a predefined energy error threshold.

At step 806, the computer program conducts the first test to determine if the opacity transfer function varies monotonically between $V_{min}$ and $V_{max}$ of the sub-volume selected at step 804. Since passing this test is required for any sub-volume to be qualified for reflected ray energy calculation, the efficiency of conducting the test significantly affects the efficiency of the present invention. In one embodiment of the present invention, a fast algorithm is developed based on two lookup tables such as FLT 506 and BLT 508 shown in FIG. 5(B). These tables are populated when the opacity transfer function is loaded into the computer.

As described above, the opacity transfer function yields the relation between the opacity on a scale of 0.0 to 1.0 and the magnitude of the data value in the 3-D dataset. An arbitrary opacity transfer function such as curve 502 may have multiple local extreme sections at certain data values such as sections 502-A, 502-B, and 502-C. Each local extreme section is bounded by two data values or two points on the horizontal axis shown in FIG. 5(A). For example, section 502-A is bounded by points $B_1$ and $F_1$. As a special case, the length of a local extreme section between points $B_3$ and $F_3$ is zero and correspondingly the two points $B_3$ and $F_3$ merge into one point. These points are evenly split into two groups, one group including $B_1$-$B_4$ and the other one including $F_1$-$F_4$. The splitting criterion is that moving along the data value increasing direction, the first encountered point is defined as $B_1$, the second point as $F_1$, the third point as $B_2$ and so on.

There are multiple entries in both forward lookup table 506 and backward lookup table 508, each entry of these two tables corresponding to a data value entry in data value table (DVT) 504. Each entry in the forward lookup table 506 contains a data value that is the difference between its corresponding data value in DVT 504 and the data value in DVT 504 that corresponds to the closest local extremum in the data value increasing direction selected from the second group comprising $F_1$-$F_4$. Each entry in the backward lookup table 508 contains a data value that is the difference between its corresponding data value in DVT 504 and the data value in DVT 504 that corresponds to the closest local extremum in the data value decreasing direction selected from the first group comprising $B_1$-$B_4$.

For example, the entries in FLT 506 corresponding to data value entries of 10, 17, 21, and 26 are set to zero because each of them corresponds to one local extrema $F_1$-$F_4$ in FIG. 5(A), and the entry corresponding to a data value entry of 12 is assigned a data value difference of |12−17|=5 since the closest local extremum among $F_1$-$F_4$ that is to the right of the data value 12 on the data value axis in FIG. 5(A) is $F_2$ at which point the magnitude of data value is 17. Similarly, the entries in BLT 508 corresponding to data value entries of 8, 13, 21, and 24 are set to zero because each of them corresponds to one local extrema $B_1$-$B_4$, in FIG. 5(A), and the entry corresponding to a data value entry of 19 is assigned a data value difference of |13−19|=6 because the closest local extremum among $B_1$-$B_4$ that is to the left of the data value 19 on the data value axis in FIG. 5(A) is $B_2$ at which point the magnitude of data value is 13.

Based on these two lookup tables, the opacity transfer function varies monotonically between $V_{min}$ and $V_{max}$ if one of the following two conditions is met $$V_{max} \leq V_{min} + F_{min}, \text{ or}$$

$$V_{min} \geq V_{max} - B_{max},$$

where $F_{min}$ is the data value difference for $V_{min}$ stored in the forward lookup table and $B_{max}$ is the data value difference for $V_{max}$ stored in the backward lookup table. This is because that the opacity transfer function over any data value section bounded by two consecutive points either from the first group $B_1$-$B_4$ or the second group $F_1$-$F_4$ varies monotonically. For instance, curve 502 in FIG. 5(A) decreases monotonically between $F_1$ and $F_2$ and increases monotonically between $B_2$ and $B_3$. The computer program based on this algorithm is very fast, which is important to the performance of direct volume rendering according to the present invention.

By way of example, assuming that a sub-volume has $V_{min}=12$ and $V_{max}=19$, the corresponding forward lookup value for $V_{min}=12$ is $F_{min}=5$ and the back lookup value for $V_{max}=19$ is $B_{max}=6$. Since $V_{max}=19$ is greater than the sum of $V_{min}=12$ and $F_{min}=5$, and $V_{min}=12$ is smaller than the difference between $V_{max}=19$ and $B_{max}=6$, neither of the two conditions listed above is satisfied; and this sub-volume can not undergo adaptive ray casting.

If the result of step 806 is false, the computer program further checks if the sub-volume under investigation is the smallest one on the corresponding octree at step 807. If true, the reflected ray energy estimation happens at a cell or sub-cell level, which is discussed in FIG. 11 below. If still false, this sub-volume is fragmented into smaller sub-volumes; and one such child sub-volume on the ray path is selected at step 808. This newly selected child sub-volume is then tested for monotonicity in the same fashion. The computer program repeats steps 806, 807 and 808 until either the opacity transfer function within a sub-volume varies monotonically or the size of the sub-volume has reached the predefined size limit, e.g., 2×2×2 cells. More detailed discussion about the latter case is provided below.

If a sub-volume passes the first test at step 806, it is then tested at step 812 to determine if the maximal energy differential (MED) is below a predefined energy error threshold. This second test evaluates whether a sub-volume is small enough to be treated as homogeneous for the purpose of direct volume rendering, which is also significant to the computational performance of the present invention. If a sub-volume can be treated homogeneously, the cost of calculating ray energy reflected by this sub-volume is relatively low, since the sub-volume does not need any further fragmentation.

At step 810, a maximum energy differential (MED) of sub-volume $S_k$ is calculated as follows:

$$MED(S_k)=MAX(|E_k \cdot (T(V_{avg})-T(V_{min}))|,|E_k \cdot (T(V_{avg})-T(V_{max}))|),$$

where $E_k$ is the residual ray energy of the ray interacting with sub-volume $S_k$ and sub-volume $S_k$ has a set of data value parameters $(V_{min}, V_{avg}, V_{max})$.

Maximum energy differential measures the amount of approximation error introduced into reflected ray energy estimation when a sub-volume of varying transparency between $T(V_{min})$ and $T(V_{max})$ is replaced by another sub-volume of homogeneous transparency $T(V_{avg})$ and the same size. Since maximum energy differential is a function of multiple parameters, there are multiple ways of reducing the approximation error, such as lowering at least one of the following three parameters:

the size of the sub-volume and therefore the difference between $V_{min}$ and $K_{max}$,
the slope of the opacity transfer function between $V_{min}$ and $V_{max}$, and
the residual ray energy $E_k$.

Figure 11:
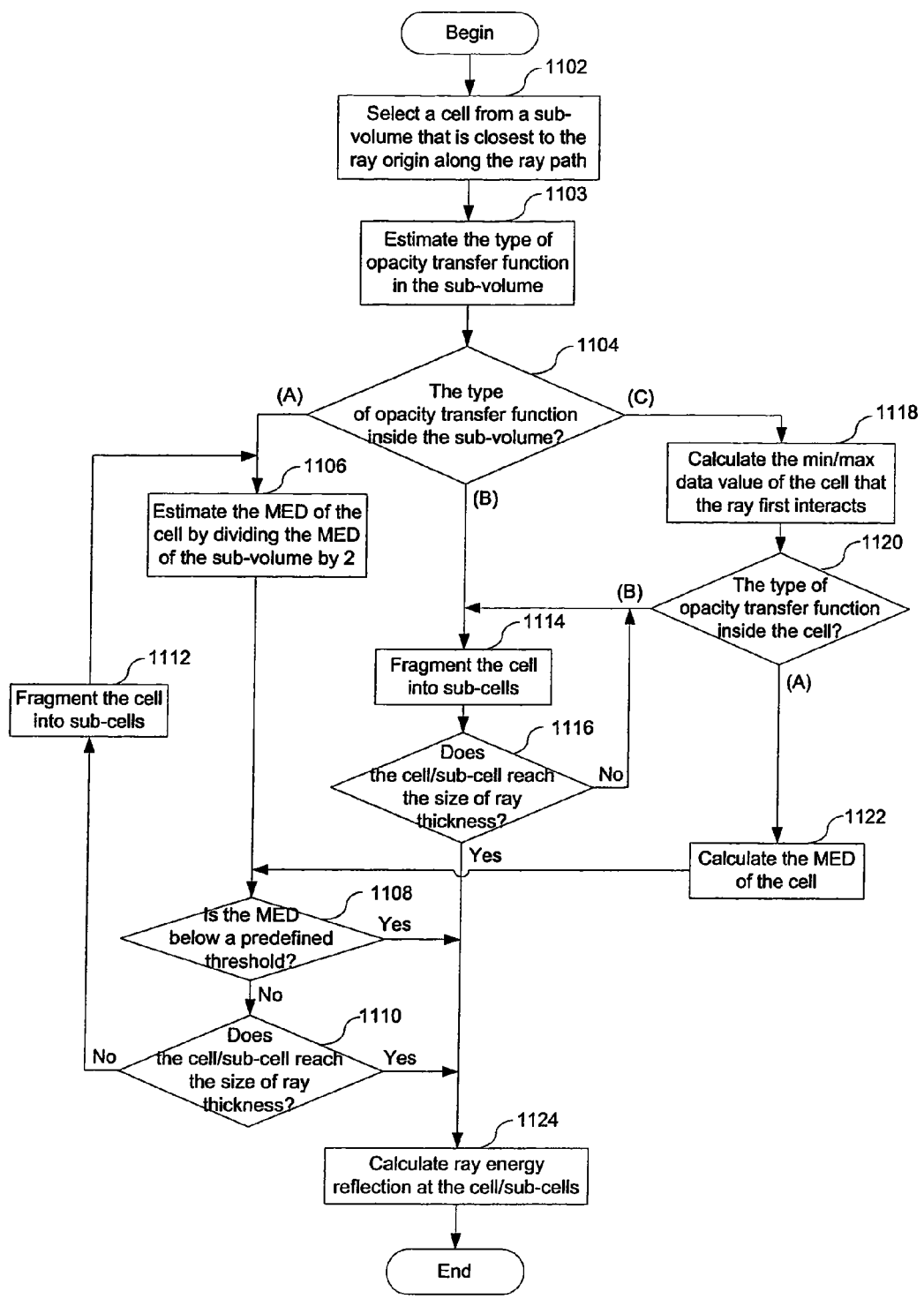
FIG. 11 is a flowchart illustrating different strategies of reflected ray energy estimation at a cell or sub-cell level.
Figure 12:
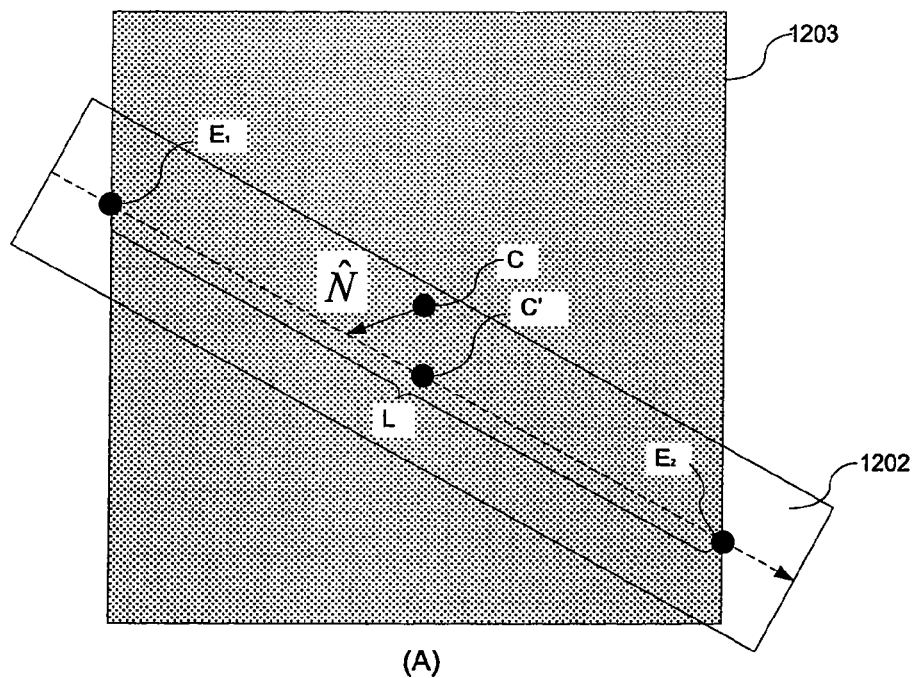
FIGS. 12(A) and 12(B) present a 2-D example illustrating different strategies of reflected ray energy estimation at a cell or sub-cell level.
FIGS. 12(C) and 12(D) illustrate a method of calculating the length of ray path within a cell or sub-cell.
FIGS. 12(E) and 12(F) present two 2-D cells that have been fragmented into different numbers of sub-cells.
Figure 12:
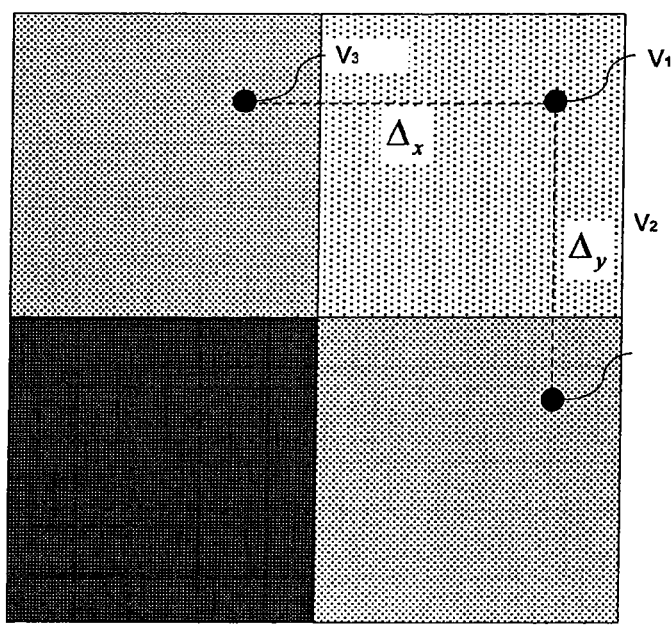

At step 812, the computer program compares a sub-volume's MED against a predefined energy error threshold provided by a user. If the MED is larger than the predefined energy error threshold, the computer program further checks at step 813 if the sub-volume under investigation is the smallest one on the corresponding octree. If true, the reflected ray energy estimation happens at a cell or sub-cell level, which is discussed in FIG. 11 below. Otherwise, the sub-volume is further fragmented provided that it is not the smallest sub-volume on an octree and one such child sub-volume is selected for further processing at step 814. A special procedure designed for treating a sub-volume that is already the smallest sub-volume on the octree is illustrated in FIGS. 10, 11 and 12 below. If MED is smaller than the predefined energy error threshold, the reflected ray energy from this sub-volume is then estimated at step 816 using the modified Phong illumination model. The accumulated reflected ray energy from a series of interactions between the ray and sub-volumes serves as one pixel value on the 2-D image plane.

After penetrating this sub-volume, the ray either exits from the other side of the image volume or impinges upon another sub-volume along the ray path. In the first scenario, the ray casting is terminated. In the second scenario, whether the corresponding ray casting should continue or stop depends on the amount of residual ray energy. Since every interaction between a sub-volume and the ray takes away a fraction of the residual ray energy, any interaction between a sub-volume and the ray whose residual ray energy is below a predefined energy level makes little contribution to a pixel value on the image plane. At step 818, the residual ray energy is compared against the predefined energy level. If the residual ray energy is above that level and the ray still travels inside the image volume, the ray casting continues starting from step 804. Otherwise, the ray casting of a particular ray is complete and stops.

Figure 9A:
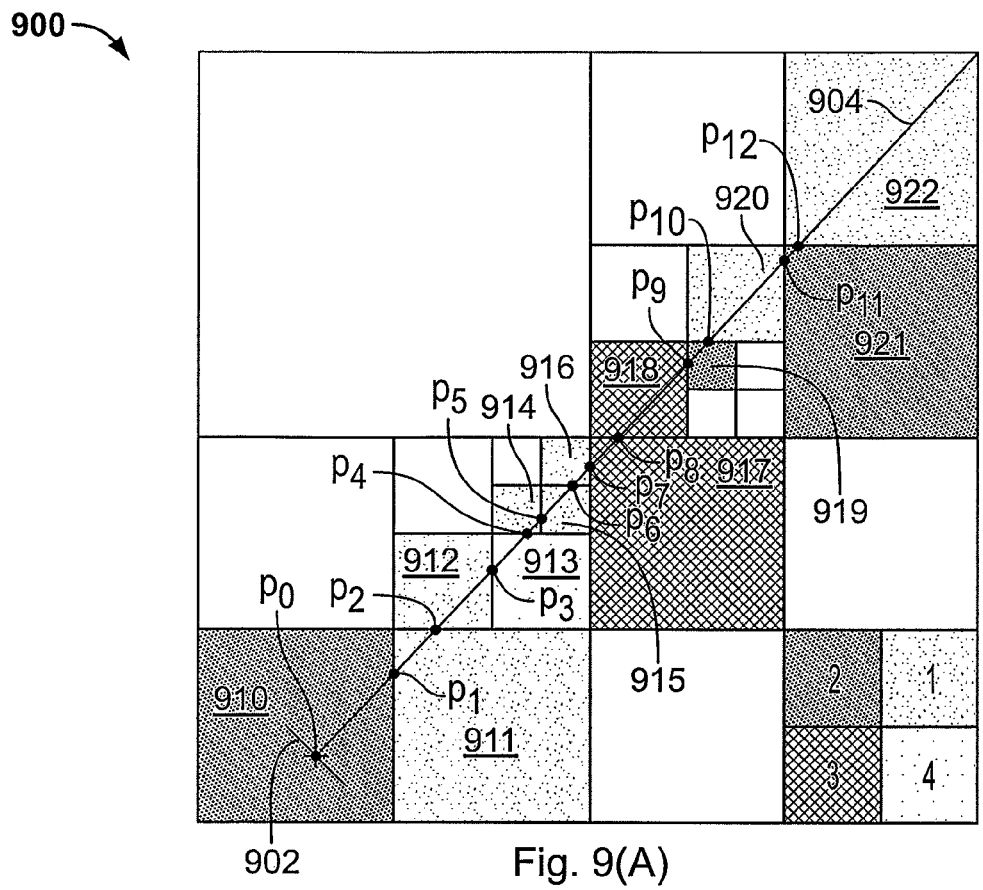
FIGS. 9(A) and 9(B) present two simple 2-D examples illustrating the key features of adaptive ray casting according to the present invention.
Figure 9B:
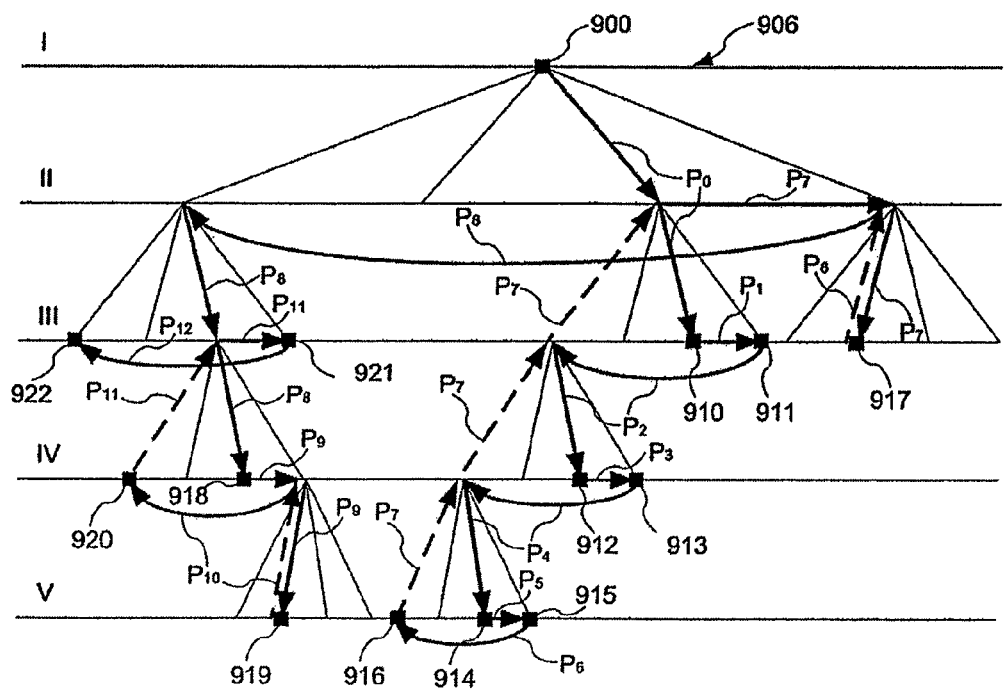

FIGS. 9(A) and 9(B) present a simple 2-D example illustrating the key features of adaptive ray casting according to the present invention. In this example, a 3-D image volume is replaced by a 2-D image square 900 and a 2-D image plane by a 1-D image line 902 that is located inside the 2-D image square 900. The 2-D image square 900 is recursively fragmented four times into a total of $$4^0+4^1+4^2+4^3+4^4=1+4+16+64+256=341$$

sub-squares (including image square 900) and each sub-square is associated with one node of quadtree 906 of FIG. 9(B). For illustrative purposes, FIG. 9(A) only contains a subset of the sub-squares including thirteen adjacent sub-squares of different sizes, from 910 to 922, that actually interact with ray 904, and similarly FIG. 9(B) only shows a subset of all quadtree nodes including those nodes corresponding to the thirteen sub-squares.

FIG. 9(A) presents an intuitive representation of the adaptive ray casting starting at point $p_0$ inside sub-square 910. There are twelve points $p_1$-$p_{12}$ on the trajectory of ray 904, each point located on a border of two adjacent sub-squares. For example, point $p_1$ represents the location at which ray 904 exits from sub-square 910 and enters into the second sub-square 911. When ray 904 passes through a sub-square, such as sub-square 915, a fraction of ray energy is reflected by the sub-square according to the modified Phong illumination model. The accumulation of ray energy reflected by the thirteen sub-squares constitutes the pixel value at point $p_0$.

Correspondingly, FIG. 9(B) illustrates the same adaptive ray casting in the context of quadtree 906. A sub-square in FIG. 9(A) is represented by a small block in FIG. 9(B), e.g., the whole image square 900 is represented by a block at the root node. A point in FIG. 9(A) extends to a cascaded path in FIG. 9(B), e.g., point $p_0$ becomes a two-leg path from level I to level III. In FIG. 9(A), it is straightforward to observe when ray 904 exits from one sub-square and enters another sub-square since the two sub-squares are next to each other. For example, sub-square 916 is next to sub-square 917. However, the same two sub-squares are not typically associated with two neighboring nodes on quadtree 906. Using the same example, sub-square 916 is associated with one leaf node at level V and sub-square 917 with one intermediate node at level III.

In order to calculate the pixel value at point $p_0$ in FIG. 9(A), the computer program first tests if ray 904 interacts with image square 900 associated with the root node. According to steps 806 and 812 of FIG. 8, image square 900 needs to pass two tests before calculating reflected ray energy. If image square 900 fails either test, the computer program selects a smaller sub-square at level I for further testing following steps 808 and 814 of FIG. 8. Since this smaller sub-square fails again, the computer program moves further down to level III of quadtree 906 and selects sub-square 910. In the example shown in FIGS. 9(A) and 9(B), this sub-square passes both tests and the computer program calculates the ray energy reflected by sub-square 910 using the modified Phong illumination model.

After that, the computer program checks if any of sub-square 910's siblings interacts with ray 904 or not. In this example, sub-square 911 is identified by the computer program, as indicated by path $P_1$ in FIG. 9(B). If there is no other sibling sub-square on the ray path, the computer moves one level up on quadtree 906 to check if any of the parent sub-square's siblings qualify for interaction. For example, after calculating ray energy reflected by sub-square 916, the computer program first evaluates sub-square 916's siblings. Since there is no match, the computer program moves up to level IV along path $P_7$, looking for a candidate among the siblings in sub-square 916's parent node. The computer program keeps searching through quadtree 906 until it finds a match at level II, as indicated by the fourth leg of path $P_7$. The computer program then applies the two tests to the candidate found at level H. In the example of FIGS. 9(A) and 9(B), it does not pass either of the tests, and the computer program then moves down to level III. Finally, sub-square 917 is identified for next reflected ray energy calculation.

According to FIG. 8, if the opacity transfer function does not distribute monotonically within a sub-volume (step 806) or if MED of the sub-volume is above a predefined energy error threshold (step 812), the sub-volume is further fragmented and one such child sub-volume is selected for further processing. However, it is impractical to fragment an image volume infinitely. First, more fragmentations produce more sub-volumes that consume more computer resources, causing the direct volume rendering method to be more expensive and less efficient. Second, as discussed above, a ray used in adaptive ray casting has a certain ray thickness that determines the image resolution. A sub-volume smaller than the ray thickness contributes too little to the image quality at an increasing computational cost.

On the other hand, it is possible that even a smallest sub-volume comprising 2×2×2 cells may fail to pass either one of the two tests conducted at steps 806 and 812. For instance, it is rare that a smallest sub-volume of 2×2×2 cells can pass any of the two tests in most medical image volumes. In this scenario, too much error may be introduced in the adaptive ray casting if the smallest sub-volume is still treated as a homogeneous body. Since the thickness of a ray is usually smaller than the dimension of a 3-D cell, a more accurate reflected ray energy estimation should be achieved at the cell or even sub-cell level. However, this phenomenon does not invalidate the principle of the present invention discussed in conjunction with FIGS. 8 and 9. First, the octree structure makes it more efficient to pin-point a cell for reflected ray energy estimation. Second, the algorithm used at a cell or sub-cell level is very similar to that used at a sub-volume level.

An accurate estimate of reflected ray energy at a cell or sub-cell level also needs the information about the distribution of opacity transfer function within a cell and the maximal energy differential of a cell. Even though such information can be retrieved from the 3-D dataset and the two lookup tables associated with opacity transfer function, the present invention proposes a more efficient approach for collecting this information by propagating the information from the smallest sub-volume level to the cell or even sub-cell level.

Figure 10A:
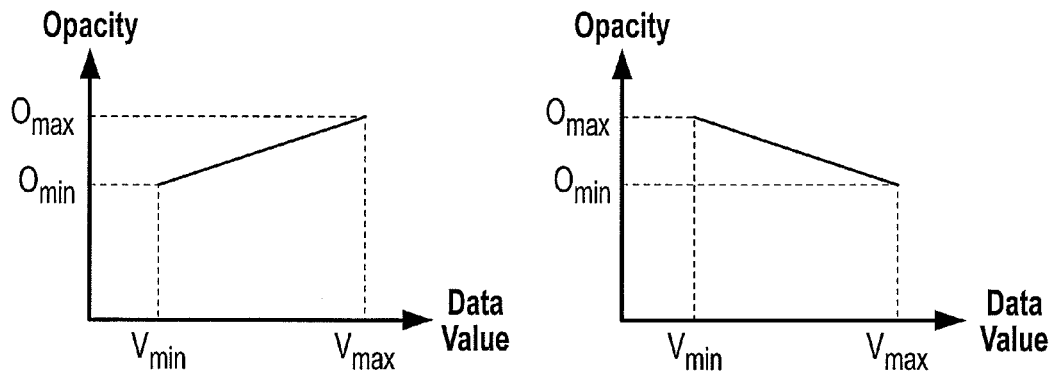
FIGS. 10(A)-10(C) illustrate three categories of opacity distribution within a sub-volume.
Figure 10B:
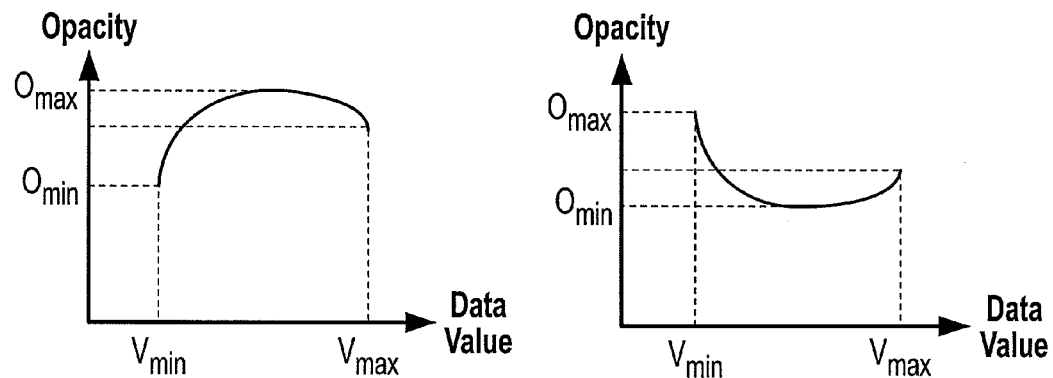
Figure 10C:
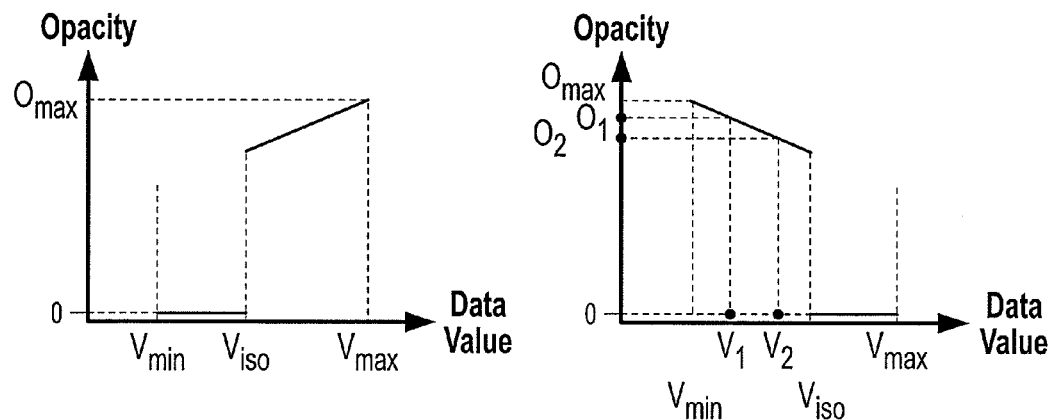

As shown in FIG. 10, given a smallest sub-volume comprising 2×2×2 cells having data value between $V_{min}$ and $V_{max}$, there are approximately three major categories of opacity distribution within the sub-volume:
  opacity varying monotonically between $V_{min}$ and $V_{max}$ (FIG. 10(A));
  opacity having a local extreme value between $V_{min}$ and $V_{max}$ (FIG. 10(B)); and
  opacity discontinuous at data value $V_{iso}$ that is between $V_{min}$ and $V_{max}$ (FIG. 10(C)) and opacity being zero between $V_{min}$ and $V_{iso}$ or between $V_{iso}$ and $V_{max}$.

If this smallest sub-volume fails to pass any of the two tests at steps 806 and 812, the computer program selects one of the eight cells from this sub-volume to produce a more accurate estimate of reflected ray energy. As shown in FIG. 8, FIG. 11 is a flowchart illustrating the process of estimating reflected ray energy at a cell or sub-cell level. More specifically, FIG. 11 illustrates different strategies adopted by the present invention when dealing with different categories of opacity distribution shown in FIG. 10.

At step 1102, the computer program selects a cell that is closest to the ray origin along the ray path out of the eight cells constituting a smallest sub-volume, and then estimates the type of opacity transfer function between $V_{min}$ and $V_{max}$ of the sub-volume at step 1103. Since the sub-volume's $V_{min}$ and $V_{max}$ are already known during the octree construction, it is very easy to determine the type of opacity transfer function within the sub-volume using the forward and backward lookup tables at step 1104.

If the opacity transfer function is monotonic between $V_{min}$ and $V_{max}$ (FIG. 10(A)), i.e., the MED has been calculated for the smallest sub-volume at step 810 of FIG. 8, the reason for estimating reflected ray energy at a cell level is that the sub-volume does not pass the test at step 812. Since the opacity distribution is monotonic within the sub-volume, it is also monotonic within any cell of the sub-volume. As a result, the step of calculating the exact MED of any cell using the data values at the eight corners of the cell stored in the 3-D dataset can be skipped. Instead, a reasonably accurate MED of the cell is achieved by dividing the MED of the sub-volume by 2 at step 1106. Compared with the computational cost of estimating the exact MED using the data values at the eight cell corners, this approach is very efficient and the approximation error in reflected ray energy estimation can be ignored. It is further noted to those skilled in the art that this approach is not restricted to MED calculation at a cell or sub-cell level, but can be extended to a sub-volume level as well.

If the halved MED is below the predefined energy error threshold at step 1108, the selected cell is small enough to be treated as a homogeneous body in estimating reflected ray energy at step 1124. To estimate the amount of ray energy reflected by a cell (or a sub-cell) according to the modified Phong illumination model, the following parameters should be available:
  the constant data value $V_{const}$ at the cell;
  the local data value gradient vector $\hat{N}$ at the cell; and
  the length L of the ray path within the cell.

There are different options when choosing the constant data value $V_{const}$. In one embodiment, the constant data value $V_{const}$ is chosen as the data value at the center of the cell by taking the average $V_{avg}$ of the data values at the eight corners of the cell. In yet another embodiment, the constant data value $G_{const}$ is chosen as the tri-linearly interpolated data value at the center of the ray path within a cell. FIG. 12(A) illustrates the two embodiments using a 2-D cell 1203 centered at a point C. Ray 1202 enters the 2-D cell 1203 at point $E_1$ and exits at point $E_2$, and the center of the ray path within the cell is point C'. In the first embodiment, the data value at point C is used in reflected ray energy estimation; and the interpolated data value at point C' is used in the second embodiment.

Besides the constant data value $V_{const}$, another important parameter is the local data value gradient vector $\hat{N}$ at a cell. In one embodiment, the local gradient vector $\hat{N}$ is estimated by taking the derivatives of the tri-linearly interpolated data value V(x,y,z) demonstrated before with respect to the three coordinates x, y and z $$\hat{N} = \left[\frac{\partial V(x,y,z)}{\partial x}, \frac{\partial V(x,y,z)}{\partial y}, \frac{\partial V(x,y,z)}{\partial z}\right]^T.$$

In yet another embodiment, the local gradient vector is estimated by taking the data value difference of two adjacent cells along x, y and z $$\hat{N} \approx \left[\frac{V(x,y,z) - V(x-\Delta_x,y,z)}{\Delta_x}, \frac{V(x,y,z) - V(x,y-\Delta_y,z)}{\Delta_y}, \frac{V(x,y,z) - V(x,y,z-\Delta_z)}{\Delta_z}\right]^T,$$

where $\Delta_x$, $\Delta_y$, and $\Delta_z$ represent the size of a cell along each coordinate. FIG. 12(B) shows a 2-D version of calculating the local gradient vector according to the second embodiment:

$$\hat{N} \approx \left[\frac{V_1 - V_3}{\Delta_x}, \frac{V_1 - V_2}{\Delta_y}\right]^T.$$

Finally, the amount of ray energy reflected by a cell depends on the length of ray path within the cell. Given that $E_0(V_{const}, \hat{N})$ represents the amount of reflected ray energy per unit length of ray path within a cell having a constant data value $V_{const}$ and a local gradient vector $\hat{N}$, the total amount of reflected ray energy can be expressed as $$E(L, V_{const}, \hat{N}) = L \cdot E_0(V_{const}, \hat{N}),$$

where L is the length of the ray path within the cell.

Figure 12C:
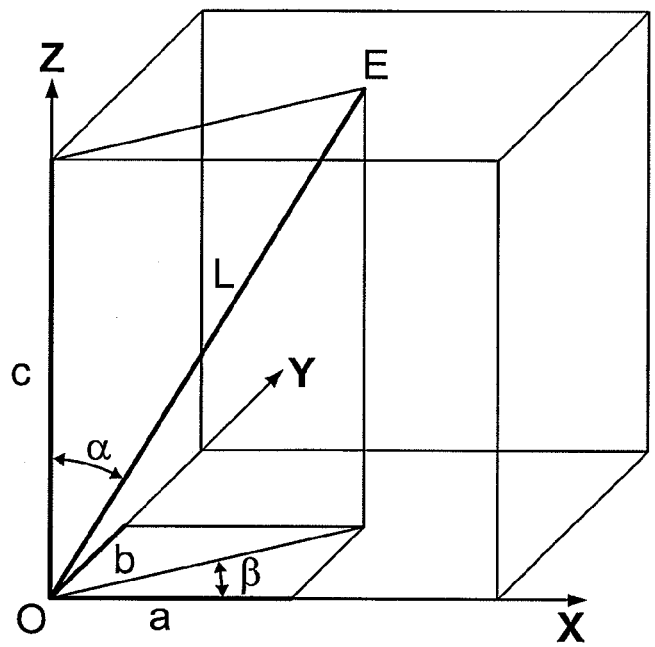
Figure 12D:
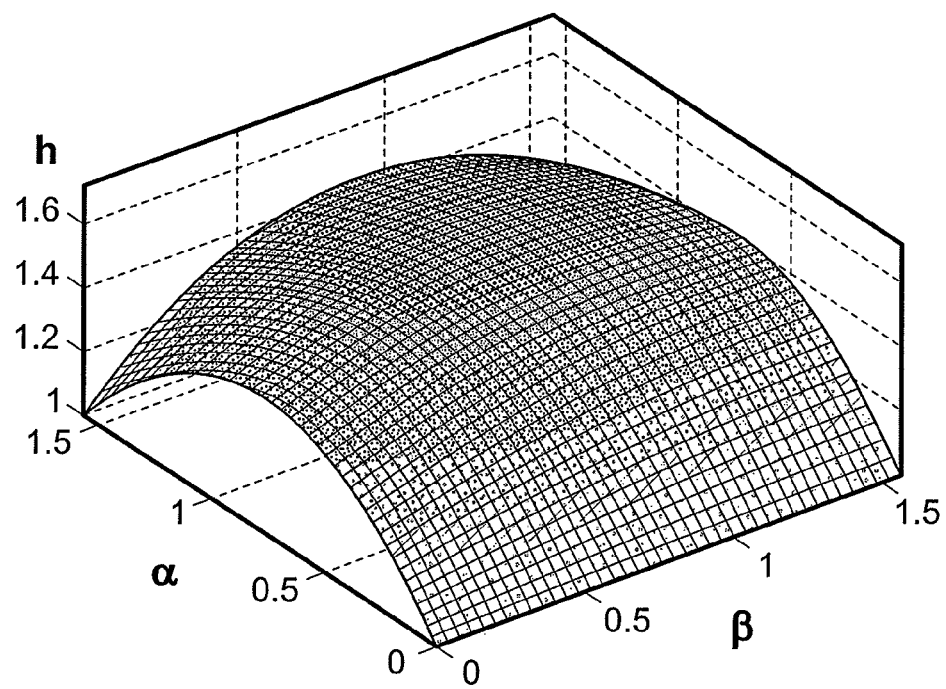

FIGS. 12(C) and 12(D) illustrate a method of calculating the length of the ray path within a cell or sub-cell. As shown in FIG. 12(C), a ray enters a cell at point O that is one corner of the cell and exits the cell at point E. The projections of the ray path L within the cell on the three coordinates x, y and z can be expressed as:

$$\begin{cases} a = L\sin(\alpha)\cos(\beta) \\ b = L\sin(\alpha)\sin(\beta) \\ c = L\cos(\alpha), \end{cases}$$

where the angles $\alpha$ and $\beta$ are defined in FIG. 12(C). Accordingly, the length of the ray path within a cell is:

$$L = \frac{a+b+c}{\sin(\alpha)\cos(\beta) + \sin(\alpha)\sin(\beta) + \cos(\alpha)},$$

or $$L = \frac{a+b+c}{h},$$

where $$h = \sin(\alpha)\cos(\beta) + \sin(\alpha)\sin(\beta) + \cos(\alpha).$$

FIG. 12(D) is a graphical illustration of the parameter h varying as a function of $\alpha$ and $\beta$, where $$0 \le \alpha \le \frac{\pi}{2} \text{ and } 0 \le \beta \le \frac{\pi}{2}.$$

In the present invention, the parameter h is pre-calculated and stored in a lookup table. After getting a set of projections (a, b, c) and their associated angles $\alpha$ and $\beta$, it is very efficient to find the corresponding parameter h in the lookup table and therefore the length of the ray path within a cell.

If at step 1108, the halved MED is still above the predefined energy error threshold, the computer program checks if the cell or sub-cell reaches the size of the ray thickness at step 1110. As discussed before, a cell or sub-cell smaller than the ray thickness contributes little to reflected ray energy. If true, the computer program stops further fragmenting the cell and calculates the reflected ray energy at step 1124. Otherwise, the cell is fragmented into eight sub-cells at step 1112 and the halved MED is further halved accordingly until the further halved MED within each sub-cell is below the predefined energy error threshold or the sub-cell reaches the size of the ray thickness.

Figure 12E:
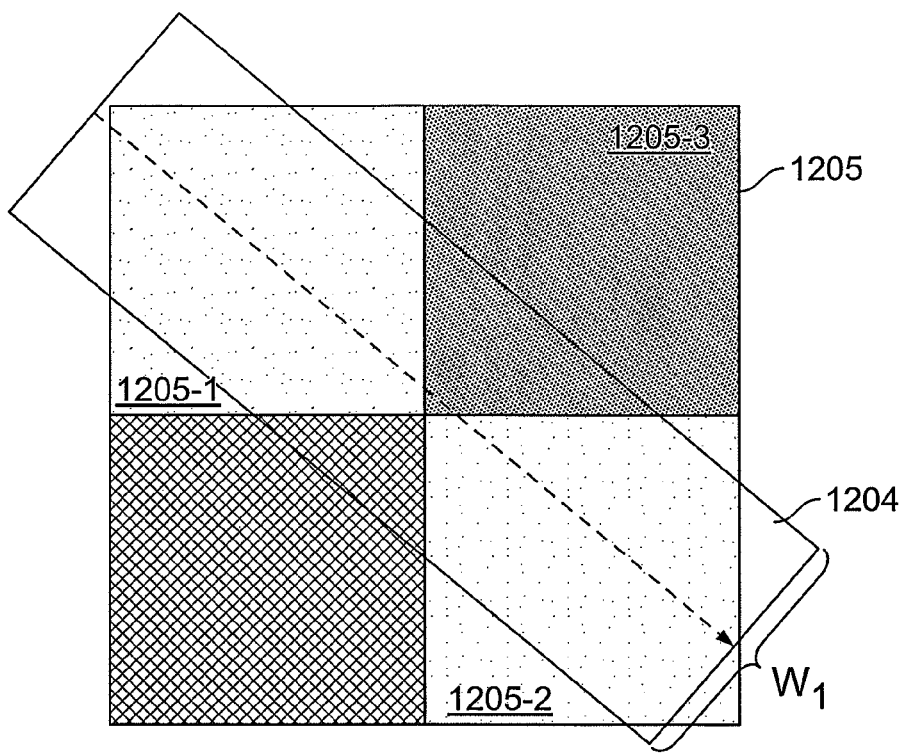
Figure 12F:
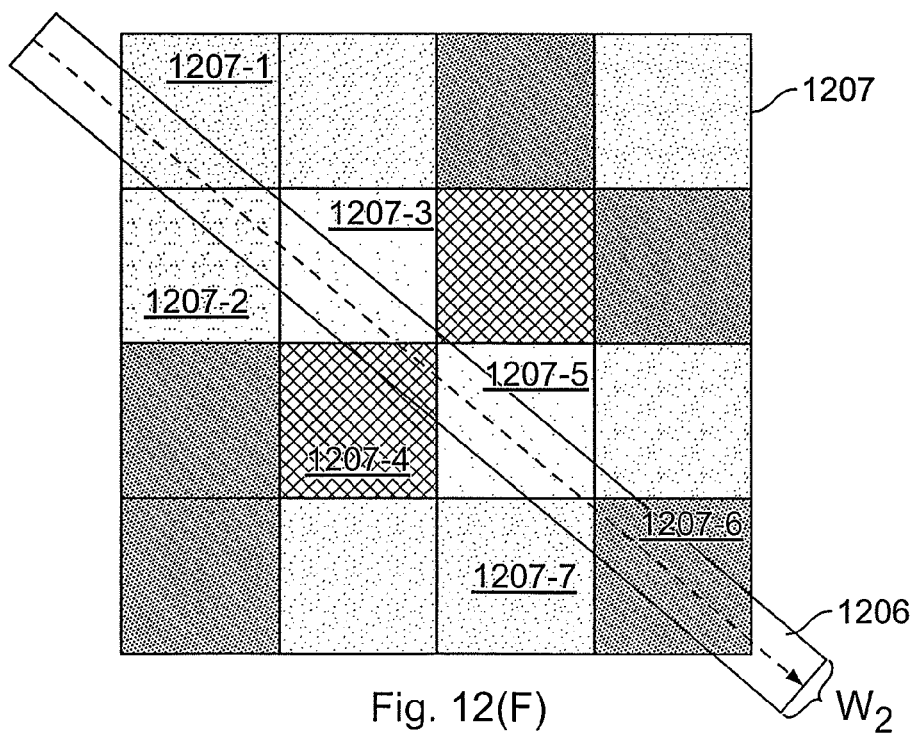

FIGS. 12(E) and (D) illustrate two 2-D cells that have met the condition at step 1108 after being fragmented into different numbers of sub-cells. In FIG. 12(E), cell 1205 is fragmented into four sub-cells and among them, two sub-cells 1205-1 and 1205-2 have substantial interactions with ray 1204 and sub-cell 1205-3 has little interaction, as indicated by the length of ray path within each sub-cell. In FIG. 12(F), cell 1207 has to be fragmented into sixteen sub-cells to pass the test at step 1108, and six of them (1207-1 to 1207-6) have substantial interactions with ray 1006, and sub-cell 1207-7 has little interaction with ray 1206. Skipping sub-cells like 1205-3 and 1207-7 saves a significant amount of computational cost in estimating reflected ray energy without introducing too much error.

Each sub-cell is assigned a constant data value. The method of calculating reflected ray energy for a sub-cell is the same as the method used for calculating reflected energy for cell 1203 at step 1110.

If the opacity transfer function is not monotonic between $V_{min}$ and $V_{max}$ of the sub-volume (FIG. 10(B)), the computer program fragments the cell selected at step 1102 into eight sub-cells at step 1114, and then checks if the sub-cell reaches the size of the ray thickness at step 1116. If true, the computer program moves to step 1124 to calculate the reflected ray energy. If false, the computer program moves back to step 1114 and fragments each sub-cell into smaller ones until the smallest sub-cell reaches the size of the ray path.

FIGS. 12(E) and (D) are used again here as 2-D examples of adaptive ray casting when the opacity distribution within a smallest sub-volume is not monotonic. Specifically, since ray 1206's thickness $W_2$ is smaller than ray 1204's thickness $W_1$, cell 1207 has been fragmented into 4×4 or 16 sub-cells, while cell 1205 has been fragmented into 2×2 or 4 sub-cells. In one embodiment, each sub-cell is assigned a constant data value based upon the interpolated data value at the center of the sub-cell, as indicated by different filling patterns in FIGS. 12(E) and (D). The dashed center line of ray 1204 shows that the ray substantially interacts with two sub-cells 1205-1 and 1205-2, each of them reflecting some ray energy back to the ray origin. The sum of reflected ray energy from the two sub-cells 1205-1 and 1205-2 constitutes the ray energy reflected by cell 1205. Similarly, the sum of reflected ray energy from the six sub-cells 1207-1 to 1207-6 constitutes the ray energy reflected by cell 1207. In contrast, sub-cell 1205-3 in FIG. 12(E) and sub-cell 1207-7 in FIG. 12(F) are skipped in estimating reflected ray energy since they have little interaction with rays 1204 and 1206, respectively.

Generally speaking, a finer fragmentation of a cell such as FIG. 12(F) usually provides a more accurate reflected energy estimation, but at a higher computational cost, since the number of interactions between the ray and sub-cells increases from two to five. The computer program controls the fragmentation level by adjusting the predefined energy error threshold and the ray thickness to reach an optimal balance between the computational cost and the image quality.

Finally, the opacity transfer function may have a discontinuity, e.g., the opacity dropping to or jumping from zero at data value $V_{iso}$ between $V_{min}$ and $V_{max}$ (FIG. 10(C)). The purpose of having a discontinuity within the opacity transfer function is that such opacity transfer function may cause certain portions of an image volume that is less interesting to a viewer to have zero opacity, and therefore be transparent to a ray. When a ray passes through any area in an image volume whose opacity is zero, it does not lose any energy. As a result, more ray energy is used for illuminating other areas of the image volume that are more interesting to the viewer. For instance, in order to provide a better image of a patient's heart, it is preferred that the tissues surrounding the heart be assigned a zero opacity such that there is no ray energy loss before a ray reaches the heart's surface.

When a smallest sub-volume has an opacity transfer function similar to FIG. 10(C), the sub-volume may fail to pass the test at step 812 of FIG. 8, because $T(V_{min})=0$ or $T(V_{max})=0$ and thereby the MED is larger than the predefined energy error threshold. Even if the function is monotonic between $V_{min}$ and $V_{max}$, the method used for estimating MED at step 1106 may no longer be appropriate. In other words, because of the discontinuity in the opacity transfer function, the halved MED of the smallest sub-volume may not be a reasonable estimate of the MED of a cell within the smallest sub-volume.

For example, if the minimum and maximum data values of the cell are $V_1$ and $V_2$, respectively, as shown in FIG. 10(C), the halved MED calculated at step 1106 will be significantly higher than the exact MED of the cell based on $V_1$ and $V_2$, since the opacity difference between $O_1$ and $O_2$ corresponding to $V_1$ and $V_2$ is very small. Instead, the computer program selects $V_1$ and $V_2$ from the data values at the eight corners of the cell at step 1118. After that, the computer program evaluates the type of opacity transfer function between $V_1$ and $V_2$ at step 1120. If the opacity transfer function is monotonic within the cell, the computer program calculated the exact MED of the cell using $V_1$ and $V_2$ at step 1122 and the cell is then treated the same as the first category. If the opacity transfer function is not monotonic, the cell is then treated the same as the second category.

As demonstrated above, the predefined energy error threshold is an important parameter that directly affects the efficiency and accuracy of the direct volume rendering method according to the present invention. This threshold substantially determines how small an image volume should be fragmented in order for a cell or sub-cell to be treated as a homogeneous body having a constant opacity value. Decreasing the threshold results in a larger number of smaller sub-cells interacting with a ray and thereby increases the computational cost per adaptive ray casting; and increasing the threshold produces an exactly opposite result.

In one embodiment of the present invention, the predefined energy error threshold is not a constant from one image to another image, but adjusted dynamically from one ray casting to another ray casting, in order to generate an optimal image at an acceptable cost. Assuming that $E_0$ is an initial energy error threshold defined by a user for a series of images having different visualization parameters, the customized energy error threshold is defined as:

$E(E_0, P_{zoom}) = E_0/\text{Sqrt}(P_{zoom})$ in the case of a parallel projection, where $P_{zoom}$ is the zoom factor indicating the physical size of an image; and $E(E_0, P_{distance}) = E_0 * \text{Log}_2(P_{distance})$ in the case of a perspective projection, where $P_{distance}$ is the distance between the ray origin and the center of the image volume.

Obviously, increasing the zoom factor $P_{zoom}$ in the case of parallel projection decreases the predefined energy error threshold, and therefore the image volume needs to be fragmented into smaller sub-volumes when estimating the reflected ray energy. As a result, the image resolution improves and less jitter effect is noticeable on the image. In contrast, increasing the distance $P_{distance}$ between the ray origin and the image volume in the case of perspective projection has the opposite impact on the image quality.

Besides image quality, user-friendliness is another important factor when evaluating a direct volume rendering algorithm. For example, a time delay between the time the image plane is positioned with respect to the image volume and the image is rendered on a computer monitor is very inconvenient in dynamic applications like cardiovascular disease diagnosis. To reduce such delay and offer the user more control over the diagnosis process, the predefined energy error threshold can be further modified by the ratio between a desired frame per second (DFPS) and an actual frame per second (AFPS):

$E(E_0, P_{zoom}, \text{DFPS}, \text{AFPS}) = E(E_0, P_{zoom}) * \text{DFPS/AFPS}$ in the case of a parallel projection; and $E(E_0, P_{distance}, \text{DFPS}, \text{AFPS}) = E(E_0, P_{distance}) * \text{DFPS/AFPS}$ in the case of a perspective projection.

As indicated by their names, DFPS refers to an image rendering speed preferred by a user and AFPS is the one that is limited by the system settings including, but not limited to, the computer hardware, the number of pixels on the image plane and the image volume as well as a default image resolution. Therefore, if the preferred image rendering speed is higher than the one offered by the system settings, or DFPS is higher than AFPS, the predefined energy error threshold increases accordingly. In this case, it is acceptable to slightly compromise the image quality in order to achieve the user-preferred image rendering speed. On the other hand, if the preferred image rendering speed is lower than the one that the system settings can reach, or DFPS is lower than AFPS, the predefined energy error threshold decreases accordingly so as to generate higher-quality images at a user-defined speed.

Figure 13A:
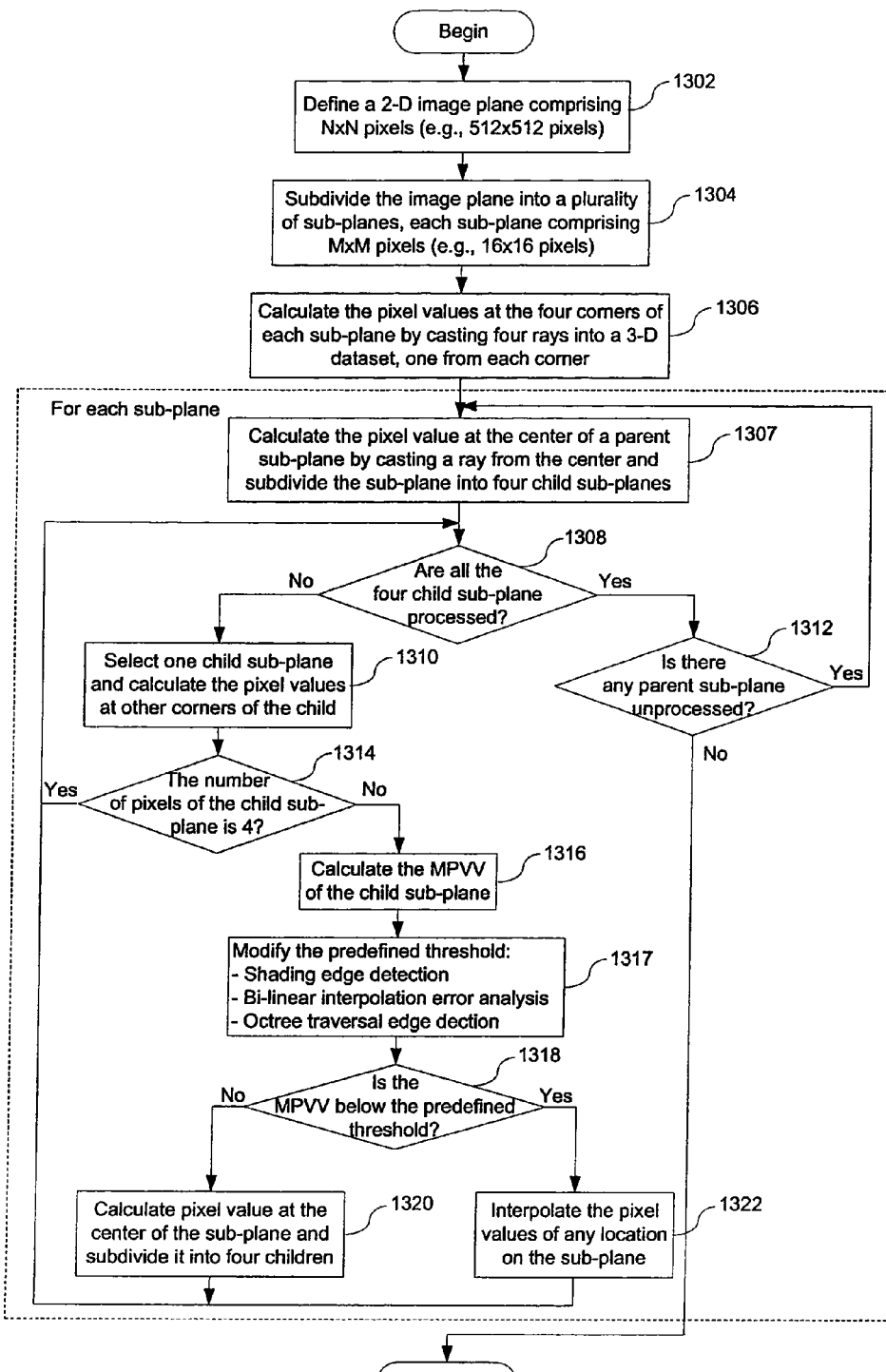
FIG. 13(A) is a flowchart illustrating 2-D image estimation according to the present invention.

2-D Image Estimation. For each ray, 3-D adaptive ray casting estimates ray energy reflected from a series of sub-volumes towards a particular location on a 2-D image plane. In one embodiment, the particular location is chosen to be the ray origin. The reflected ray energy at each ray origin is summed and then converted into a pixel value. Since 3-D adaptive ray casting is a relatively expensive operation, the efficiency of the direct volume rendering algorithm according to the present invention is directly dependent on the number of rays that have to be cast to generate a 2-D image. FIG. 13(A) illustrates a preferred embodiment, e.g., a computer program, in which the 2-D image estimation directs the adaptive ray casting process in an optimal manner so as to reduce the number of ray castings with negligible, if not imperceptible, effects on the image quality.

At step 1302, the computer program defines a 2-D image plane that is a certain distance away from and oriented in a certain direction from a 3-D dataset as shown in FIGS. 1(A) and 1(B). The image plane is usually represented by a 2-D array comprising N×N elements, each element of the 2-D array storing one pixel value at a corresponding location on the image plane. Therefore, the image generated on the plane has N×N pixels, e.g., 512×512.

At step 1304, the computer program subdivides the image plane into a plurality of sub-planes of the same size, each sub-plane corresponding to one section in the 2-D array. In one embodiment, the image plane comprising 512×512 pixels is subdivided into 32×32(=1024) sub-planes, each sub-plane comprising 16×16 pixels. The size of a sub-plane is chosen under the assumption that there is a significant degree of pixel value variation between neighboring sub-planes.

At step 1306, for each sub-plane generated in the previous step, the computer program casts four rays from the four corners of the sub-plane into the 3-D dataset, one from each corner, and calculates four pixel values at the four corner using adaptive ray casting.

Starting from step 1307, each sub-plane is processed recursively in order to associate every element in the 2-D array with a pixel value. At the end of this recursive process, a 2-D image of the 3-D dataset has been generated in the 2-D array. More specifically, one sub-plane is selected and a ray is launched from the center of the sub-plane towards the 3-D dataset at step 1307, which produces a pixel value at the center and also subdivides the sub-plane into four smaller child sub-planes. For example, if the selected sub-plane has 16×16 pixels, each child sub-plane has 8×8 pixels.

At step 1308, the computer program checks if all the four child sub-planes have been processed such that every pixel on the parent sub-plane has a unique pixel value from either interpolation or ray casting. If true, the computer program further checks if there is any parent sub-plane generated at step 1304 that has not been processed at step 1312. If the result from step 1312 is false, it means that every element in the 2-D array has been assigned a pixel value and a 2-D image has been formed in the array, which is ready to be rendered on a graphical display device, e.g., a computer monitor. If the result from step 1312 is true, the computer program then goes back to step 1307 and starts processing the next sub-plane generated at step 1304.

Figure 13B:
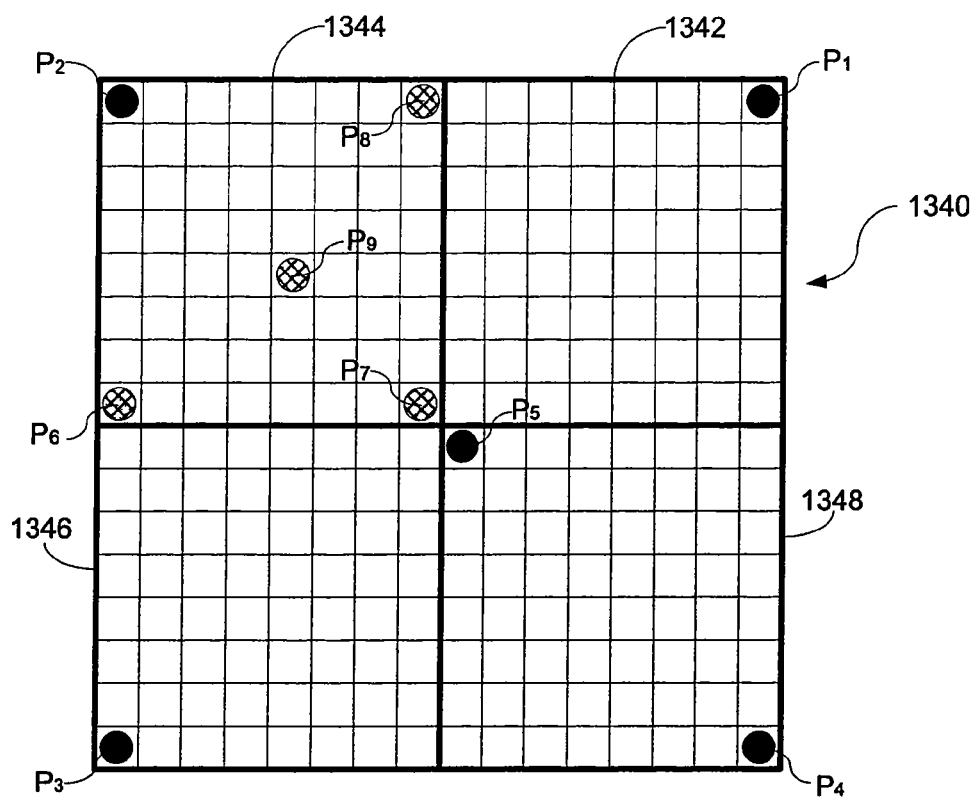
FIG. 13(B) presents an example of 2-D image estimation in a sub-plane according to the present invention.

If the result from step 1308 is false, the computer program then selects one unprocessed child sub-plane and calculates the pixel values at other corners of the child sub-plane. FIG. 13(B) is an example illustrating the operations conducted at steps 1307 and 1310. A sub-plane 1340 comprises 16×16 pixels and the pixel values $P_1$-$P_4$ are associated with the pixels at the four corners of the sub-plane. At step 1307, a new ray is cast from the center of the sub-plane, generating a new pixel value $P_5$ and subdividing the sub-plane 1340 into four child sub-planes 1342-1348. At step 1310, the computer program selects one child sub-plane, e.g., 1344, and launches three rays from the other three corners of the sub-plane, generating three more pixel values $P_6$-$P_8$.

At step 1314, the computer program checks if the number of pixels in a child sub-plane is 2×2(=4) or not. If the number of pixels is four, there is no pixel left without a pixel value at step 1310 and the computer program goes back to step 1308, dealing with the next child sub-plane, if any.

If the number of pixels is not four, e.g., sub-plane 1344 has 8×8 pixels, at step 1316 the computer program calculates the maximum pixel value variation (MPVV) of this child sub-plane. As indicated by its name, MPVV measures the pixel value distribution within a child sub-plane. In one embodiment, MPVV is defined as $$MPVV = MAX(|P_{avg}-P_1|, |P_{avg}-P_2|, |P_{avg}-P_3|, |P_{avg}-P_4|)/s,$$

where S is the total number of pixels within a sub-plane, $P_1$-$P_4$ are pixel values at the corners of the sub-plane and $P_{avg}$ is the average of $P_1$-$P_4$ $$P_{avg} = \frac{1}{4}(P_1 + P_2 + P_3 + P_4).$$

At step 1317, the computer program modifies a predefined imaging error threshold, which is an important parameter that significantly affects the image resolution and image rendering speed in the present invention. For example, lowering the predefined imaging error threshold causes the child sub-plane 1344 to be fragmented into smaller child sub-planes at step 1320. In response, the computer program conducts more adaptive ray castings at the center of each child sub-plane. This results in a higher resolution of the image within the child sub-plane 1344 corresponding to the edge of an internal structure, e.g., a bone in medical imaging, because the pixel value generated by adaptive ray casting is more accurate than that generated by bi-linear interpolation. On the other hand, adaptive ray casting is a much more expensive operation than the bi-linear interpolation. More details about the predefined imaging error threshold modification are provided below in conjunction with FIGS. 14(A)-(C).

At step 1318, the MPVV of child sub-plane 1344 is compared with the predefined imaging error threshold modified at step 1317. If the MPVV of child sub-plane 1344 is above the predefine imaging error threshold, a new ray is launched from the center of this child sub-plane at step 1320, which generates a new pixel value $P_9$. The child sub-plane 1344 is then subdivided into four smaller child sub-planes, each sub-plane comprising only 4×4 pixels.

Figure 13C:
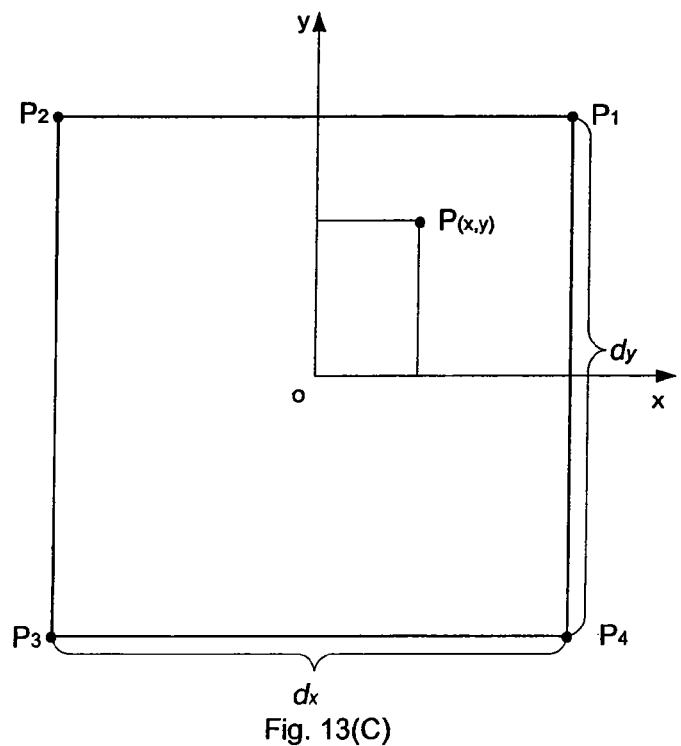
FIG. 13(C) presents an example of bi-linear interpolation of pixel values.

If the MPVV of child sub-plane 1344 is below the predefined imaging error threshold at step 1318, the pixel value variation within the child sub-plane can be approximated by interpolation. In one embodiment, the pixel value distribution within a sub-plane is approximated by a bi-linear interpolation of the four pixel values at the corners of the sub-plane. As shown in FIG. 13(C), the pixel value P(x,y) at any location (x,y) can be bi-linearly interpolated as $$P(x, y) = \frac{P_1}{4}\left(1 + \frac{2x}{d_x}\right)\left(1 + \frac{2y}{d_y}\right) + \frac{P_2}{4}\left(1 - \frac{2x}{d_x}\right)\left(1 + \frac{2y}{d_y}\right) +$$

-continued $$\frac{P_3}{4}\left(1-\frac{2x}{d_x}\right)\left(1-\frac{2y}{d_y}\right)+\frac{P_4}{4}\left(1+\frac{2x}{d_x}\right)\left(1-\frac{2y}{d_y}\right).$$

After step 1320 or 1322, the computer program goes back to step 1308 to process the next child sub-plane, if any. This process continues until every element in the 2-D array stores a pixel value corresponding to one location on the image plane that is created either through 3-D adaptive ray casting or bi-linear interpolation of the ray casting results. Finally, a 2-D image of the 3-D dataset is generated that can be rendered on a graphical display device such as a computer monitor.

As discussed above, the predefined imaging error threshold can be used to modulate the image resolution and image rendering speed in the present invention. Specifically, the predefined imaging error threshold is adjusted dynamically from one sub-plane to another to accommodate different image resolution requirements for different parts of a 2-D image. For example, if a sub-plane does not contain complex internal structures or high-frequency image components such as the edge of an object, the predefined imaging error threshold is set to a relatively high magnitude and vice versa. In one embodiment, three methods are employed when adjusting the predefined imaging error threshold so as to reach a balance between image quality and image rendering speed. As shown at step 1317 of FIG. 13(A), they are:

shading edge detection;
bi-linear interpolation error analysis; and
octree traversal edge detection.

Generally speaking, the resolution of an image is more dependent upon its high frequency components, e.g., the edge of an object, since the human eye is more sensitive to high frequency components. However, bi-linear interpolation, even though efficient, tends to smear out the high frequency components of an image because it is essentially a low-pass filter. Therefore, the present invention employs adaptive ray casting to estimate the pixel values by decreasing the imaging error threshold whenever needed. To do so, the computer program needs to learn in advance that it is processing a sub-plane that includes or approaches an edge. Shading edge detection is a method designed for such purpose.

Figure 14A:
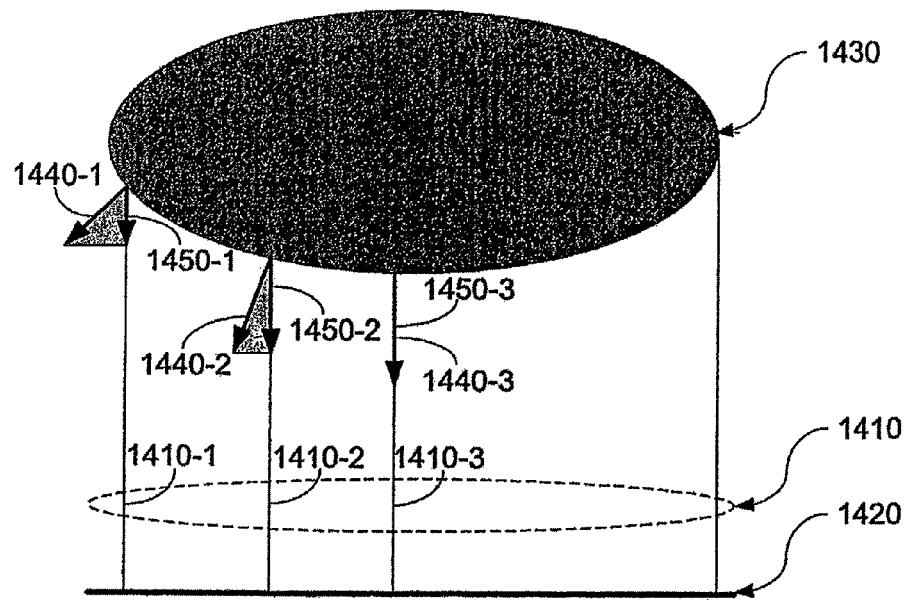
FIGS. 14(A)-14(C) illustrate three methods of modifying a predefined imaging error threshold.

FIG. 14(A) illustrates the principle of shading edge detection using a 2-D example. When a plurality of rays 1410 such as 1410-1, 1410-2, 1410-3 are launched from an image line 1420 towards a 2-D object 1430 embedded in an image volume, some of them interact with the central area of the object, e.g., ray 1410-3, and some of them interact with the edge of the object, e.g., ray 1410-1. As discussed above, the local gradient vectors of the object corresponding to different ray paths have been calculated for estimating the reflected ray energy, such as arrows 1440-1, 1440-2, and 1440-3.

The computer program then projects each local gradient vector onto a corresponding ray path such as 1450-1, 1450-2, 1450-3, and the length of the projected gradient vector, or the cosine value of the angle between the gradient vector and the ray path indicates whether the ray approaches the edge of the object. For example, a smaller cosine value like arrow 1450-1 indicates that the ray 1410-1 is very close to the left edge of the object 1430, suggesting that the pixel values in this area should be estimated through adaptive ray casting, not bi-linear interpolation. In response, the computer program decreases the predefined imaging error threshold such that the sub-plane near the origin of ray 1410-1 has to be subdivided into smaller child sub-planes to satisfy the condition at step 1318.

In contrast, a larger cosine value like arrow 1450-3 suggests that the image variation near the origin of ray 1410-3 is minor and that the bi-linearly interpolated pixel values are accurate enough. As a result, the predefined imaging error threshold in that area does not need to decrease or may even increase. Such adaptive arrangement of the imaging error threshold makes sure that the expensive adaptive ray casting operation is conducted only if necessary, and the use of computer resources is reduced with little loss image resolution.

Figure 14B:
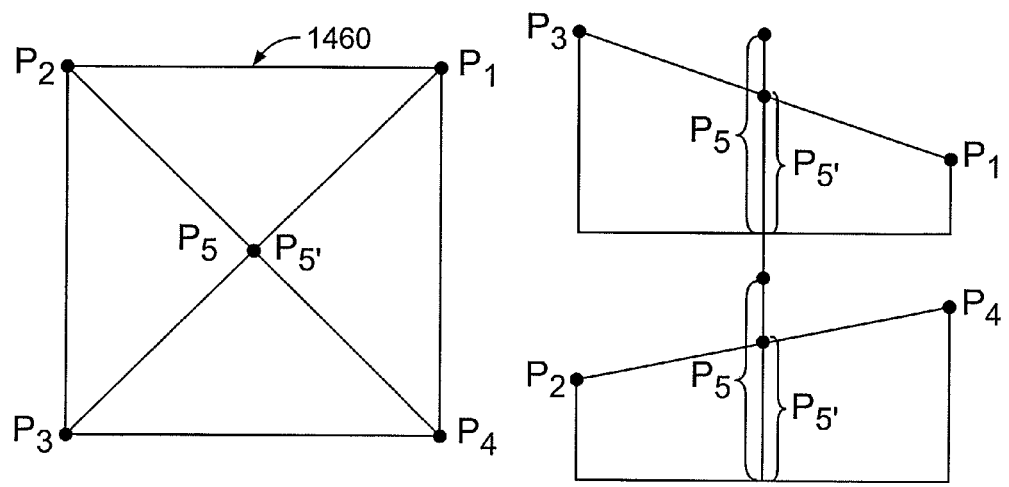

Even though the ray casting version of a pixel value is more accurate, it does not render the corresponding interpolation version useless. Actually, the difference between the two versions, or the bi-linear interpolation error, serves as an important indicator on how to adapt the imaging error threshold to different sub-planes. As shown in FIG. 14(B), a sub-plane 1460 has four known pixel values $P_1$-$P_4$ at its four corners. The bi-linearly interpolated pixel value $P_5$ at the center of the sub-plane 1460 is defined as $$P_{5'} = \frac{1}{4}(P_1 + P_2 + P_3 + P_4).$$

Meanwhile, assume that a pixel value $P_5$ is also generated by adaptive ray casting when the sub-plane 1460 is subdivided into four smaller sub-planes, and the absolute difference between the two pixel values $|P_5$-$P_{5'}|$ shows how accurate the result of bi-linear interpolation is within this sub-plane 1460. For instance, a larger absolute difference not only means the sub-plane needs to be further fragmented, but also suggests that there may be a significant pixel value variation within the sub-plane 460. In response, the computer program may significantly decrease the imaging error threshold to fully capture the 3-D characteristics of the internal structures within an image volume on the sub-plane. On the other hand, the predefined imaging error threshold may be increased in response to a smaller absolute difference so as to improve image rendering speed, but without losing too much image resolution.

Figure 14C:
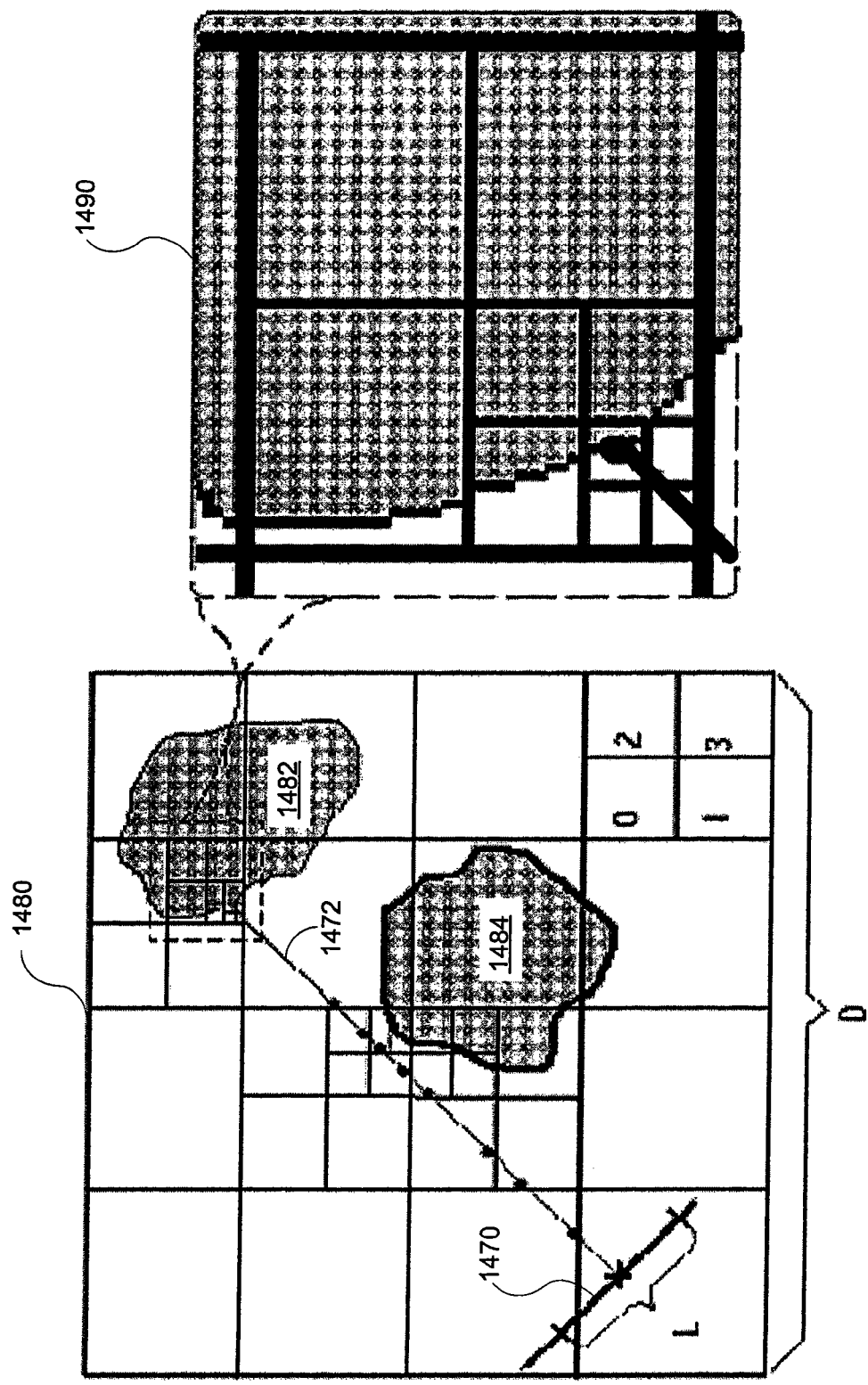

Octree traversal edge detection refers to a method of modulating the imaging error threshold through checking the size difference between a sub-volume, a cell or a sub-cell that has been selected for estimating reflected ray energy and an image plane to catch a smaller 3-D object or the sharp edge of a 3-D object embedded within an image volume. In the example of FIG. 14(C), a 2-D dataset 1480 comprises at least two objects 1482 and 1484, and the length of the 2-D dataset is D. Inside the dataset 1480 is an image plane 1470 and the length of the image plane 1470 is L. Along the ray path 1472 are a series of sub-volumes of different sizes that contribute to the reflected ray energy estimation. A zoom-in view 1490 depicts details of some of these sub-volumes in object 1482. Assuming that the maximum fragmentation level of the dataset is Q, a parameter Z indicating the existence of small objects or sharp edges of an object near the ray path is defined as:

$$Z = L - \frac{D}{2^{Q-1}}.$$

A positive Z means that there are some very small sub-volumes along the ray path 1472 that interact with the ray, such as the small block containing the sharp edge of object 1482 in the zoom-in view 1490. In other words, a positive Z suggests that the predefined imaging error threshold on the image plane 1470 near the origin of ray path 1472 should decrease so as not to miss any small objects or sharp edges.

Finally, similar to the predefined energy error threshold, the predefined imaging error threshold can also be adjusted according to the ratio of desirable frame per second and actual frame per second. A ratio higher than one requires more image frames to be rendered than the system's default rendering capability. As a result, the predefined imaging error threshold increases, and the system resources allocated for each image frame decreases. A ratio lower than one requires less image frames to be rendered than the system's default rendering capability. Therefore, the predefined imaging error threshold decreases, and the system resources allocated for each image frame increases.

The adaptive direct volume rendering method discussed above can be implemented in a regular computer system and does not need any special hardware support.

Figure 15:
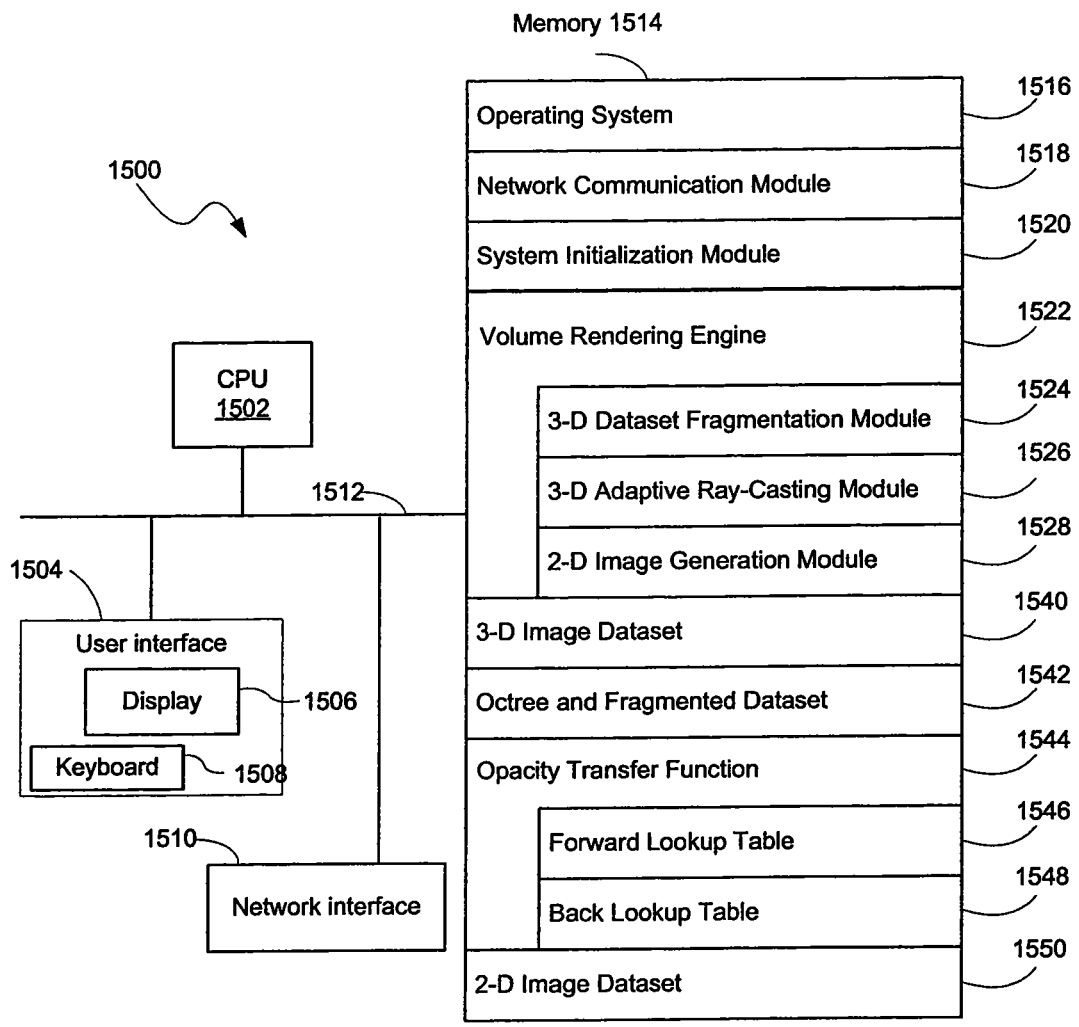
FIG. 15 is a block diagram of an adaptive image volume rendering system according to the present invention.

FIG. 15 illustrates such a system 1500 in accordance with the present invention. An adaptive direct volume rendering system 1500 typically comprises one or more central processing units (CPU's) 1502, memory 1514, and one or more communication buses 1512 for interconnecting the various components of system 1500. Adaptive direct volume rendering system 1500 also includes a user interface 1504, including, for example, a display device 1506 for displaying 2-D images of a 3-D dataset and a keyboard 1508 for receiving a user's image rendering requirements. System 1500 may optionally include a network or other communications interface 1510 for retrieving 3-D datasets from remote storage devices or transmitting rendering results to remote clients.

Memory 1514 includes high-speed random access memory and may also include non-volatile memory, such as one or more magnetic disk storage devices (not shown). Memory 1514 may also include mass storage that is remotely located from the central processing unit(s) 1502. Memory 1514 preferably stores:

an operating system 1516 that includes procedures for handling various basic system services and for performing hardware dependent tasks;

a network communication module 1518 that is used for connecting system 1500 to various security devices or client computers (not shown) and possibly to other servers or computers via one or more communication networks (wired or wireless), such as the Internet, other wide area networks, local area networks, metropolitan area networks, and so on;

a system initialization module 1520 that initializes other modules and data structures stored in memory 1514 required for the appropriate operation of system 1500;

an adaptive volume rendering engine module 1522 that generates 2-D images of a 3-D dataset and renders it on display device 1506;

a 3-D dataset 1540 and a corresponding Octree structure 1542 representing the fragmented 3-D dataset;

a 2-D image dataset 1550 and a corresponding Quadtree structure representing the fragmented 2-D image; and an opacity transfer function table 1544 that determines the opacity value of each element in the 3-D dataset 1550.

The direct volume rendering engine module 1522 includes executable procedures, sub-procedures, and other data structures supporting the adaptive volume rendering process, such as:

a 3-D dataset fragmentation module 1524 that fragments an 3-D dataset into multiple sub-volumes, calculates a set of data value parameters for each sub-volume, constructs an octree structure and associates each sub-volume with one node on the octree;

a 3-D adaptive ray casting module 1526 that selects a series of sub-volumes that interacts with a ray based on a predefined energy error threshold and then estimates the reflected ray energy by each sub-volume using the modified Phong illumination model; and a 2-D image rendering module 1528 that invokes the 3-D adaptive ray casting module 1526 selectively, constructs a quadtree structure for pixel values estimated by adaptive ray casting, and constructs a 2-D image of the 3-D dataset by interpolating the pixel values at those ray origins on the 2-D image plane.

In order to quickly locate a sub-volume that may interact with a ray, the opacity transfer function table 1544 preferably includes:

a forward lookup table 1546 that stores data value differences between an arbitrary data value and a designated data value higher than the arbitrary data value at which the opacity is a local extreme value; and a backward lookup table 1548 that stores data value differences between an arbitrary data value and a designated data value lower than the arbitrary data value at which the opacity is a local extreme value.

As shown in FIG. 13(A), during the 2-D image estimation, the system 1500 first subdivides an image plane into a plurality of sub-planes and then processes each sub-plane sequentially, associating every pixel on the sub-plane with a pixel value through bi-linear interpolation or adaptive ray casting, if necessary. In the end, the system 1500 assembles the pixel values associated with different sub-planes into a single 2-D image and renders it on a computer monitor. Since the processing result of one sub-plane is independent from that of another sub-plane, the adaptive direct volume rendering algorithm is actually a parallel algorithm that can be implemented on a parallel computer or a cluster of computers.

Figure 16:
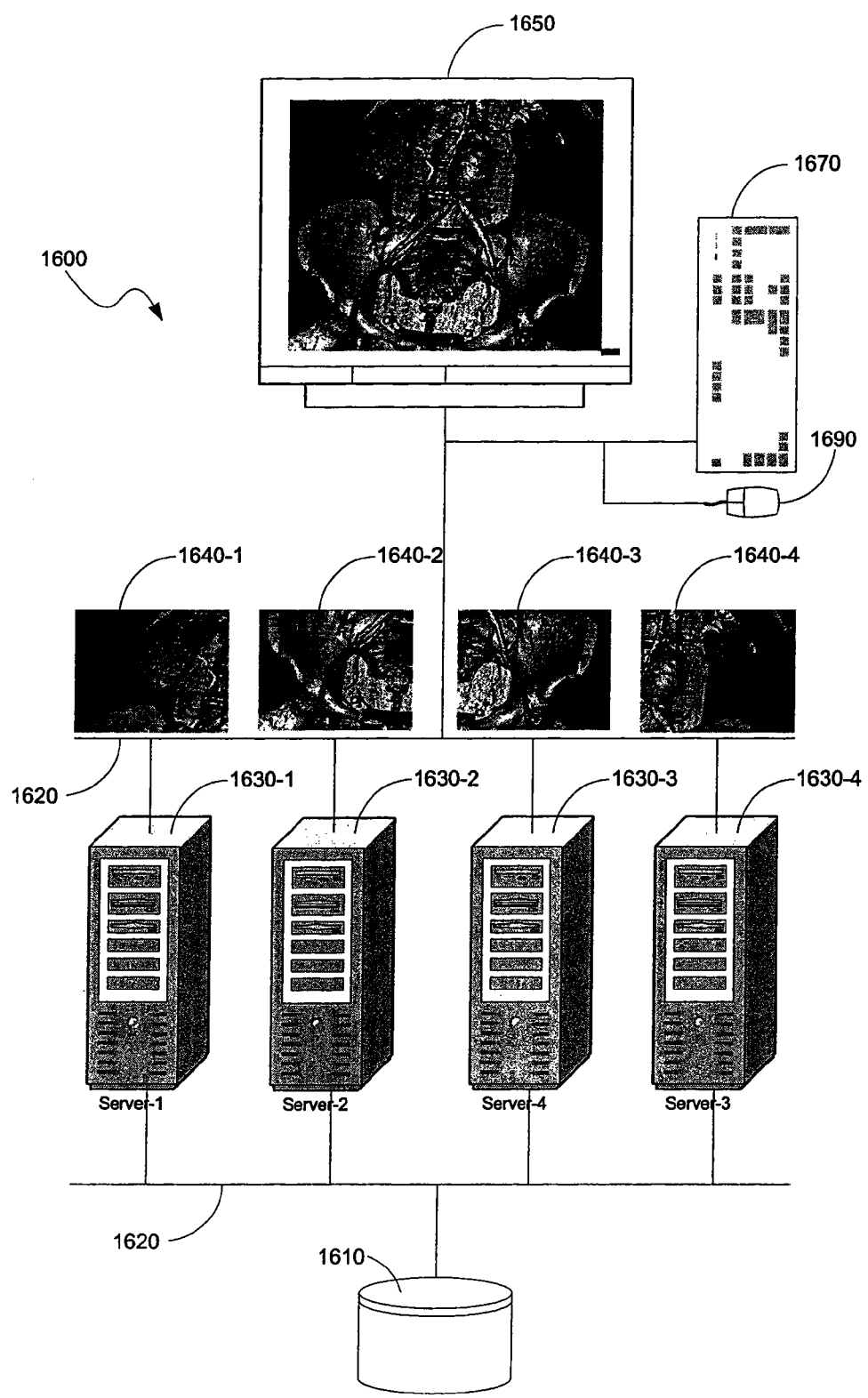
FIG. 16 is a block diagram of the adaptive image volume rendering system implemented a computer cluster according to the present invention.

FIG. 16 illustrates one embodiment of the present invention that employs a computer cluster 1600. The cluster 1600 comprises:

a data storage device 1610, e.g., a hard disk, that stores one or more image volumes;

a plurality of computer servers 1630-1, 1630-2, 1630-3, and 1630-4, each server preferably having one or more CPUs and its own memory storing the direct volume rendering software;

a computer monitor 1650 for displaying the images generated by the cluster;

a keyboard 1670 and a mouse 1690 for receiving the command and rendering parameters from a user; and a communication bus 1620 connecting the various components.

Illustratively, there are four servers 1630-1, 1630-2, 1630-3, and 1630-4 in the cluster, and each server is responsible for generating a quarter of the final image, as indicated by the partial images 1640-1, 1640-2, 1640-3, and 1640-4. Within each server, the job may be further partitioned between different CPUs, if there is more than one CPU per server. After all the partial images 1640-1 through-4 have been generated, one of the servers assembles the partial images into a complete image and renders it on the monitor 1650.

Figure 17:
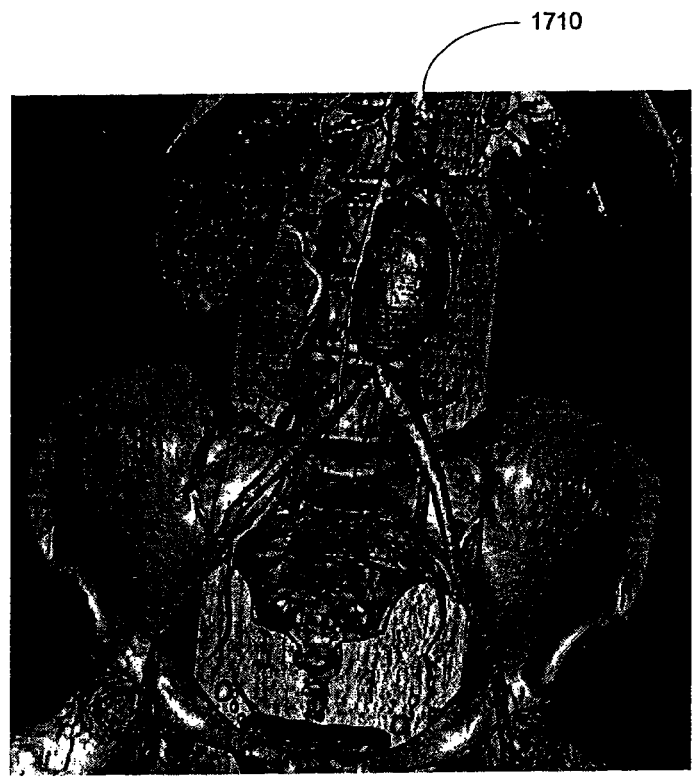
FIG. 17 shows two images of different parts of a human body through adaptive direct volume rendering of a medical image volume.
Figure 17:
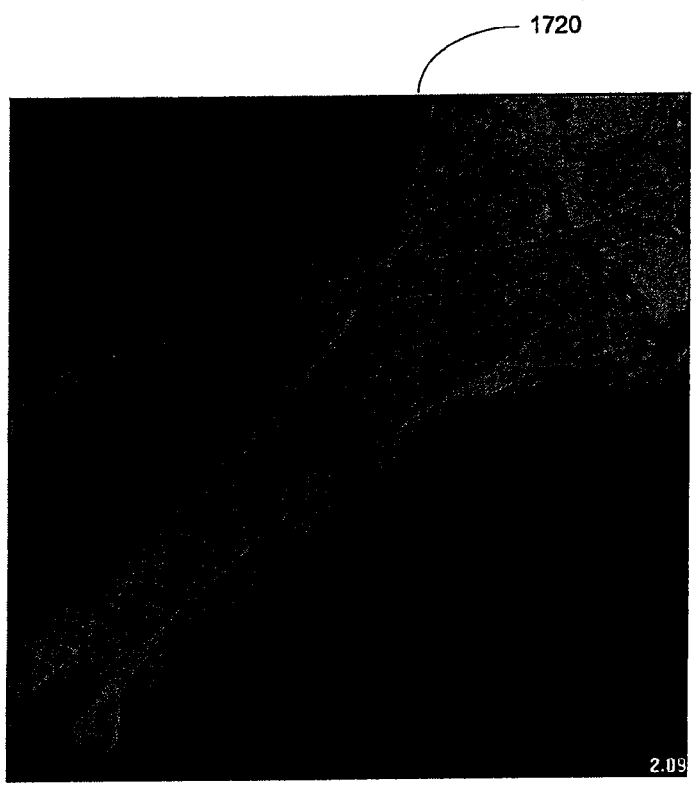

Examples. FIGS. 17-20 provide several examples of the use of the present invention to different industrial applications. FIGS. 17(A) and 17(B) are two images generated from a medical image volume produced by a CT scan. Image 1710 shows different bones and organs as well as their relative locations inside a human body. Image 1720 reveals considerable detail about a particular bone.

Figure 18:
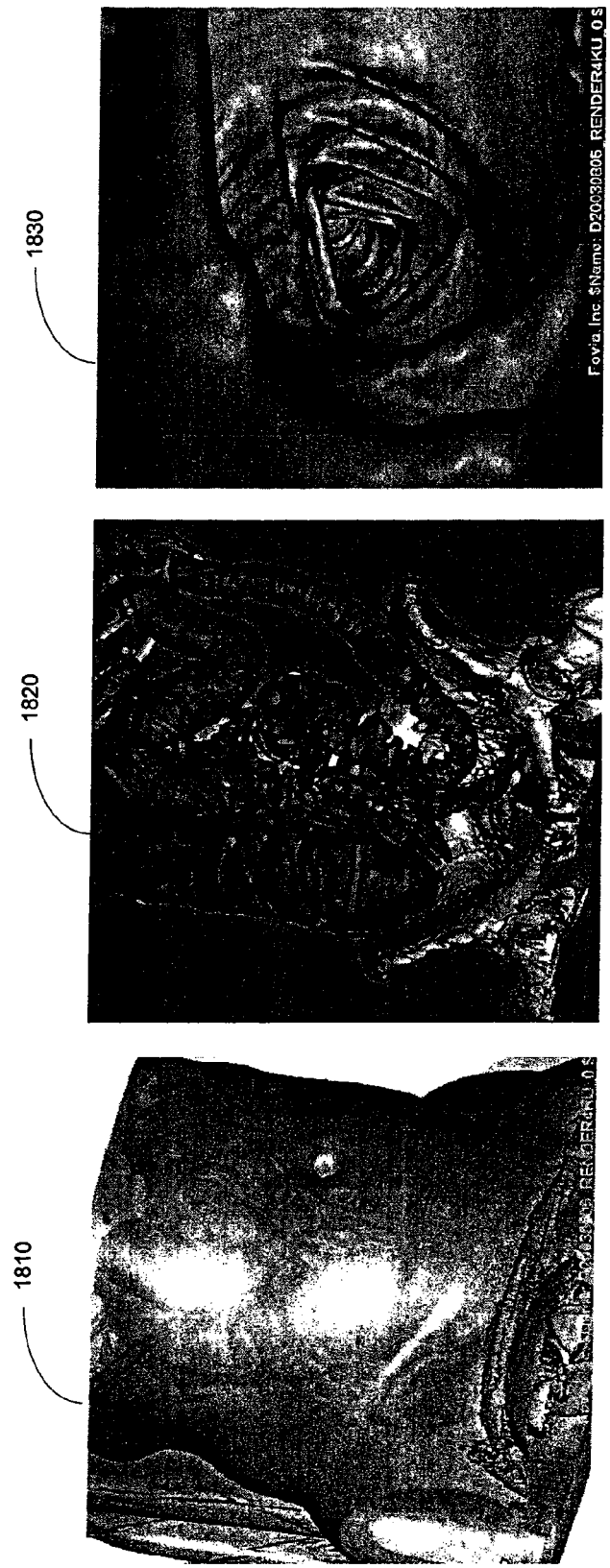
FIG. 18 depicts three images having different 3-D characteristics of a same medical image volume when the adaptive direct volume rendering system employs different visualization parameters, e.g., different opacity transfer functions.

FIG. 18 depicts three images of a human body generated from a same image volume at different positions and using different visualization parameters, e.g., opacity transfer function. When generating image 1810, the visualization parameters are chosen such that a significant amount of ray energy is reflected by the skin of the body. As a result, both the internal organs and the body contour are visible in the image. In contrast, most of the flesh tissues and internal organs are removed from image 1820 with the colon left, which is similar to, but more delicate than a regular X-ray photo. The advantage of generating images like image 1820 is that a doctor is able to conduct a virtual colonoscopy as shown in image 1830 without causing any inconvenience to the patient.

Figure 19:
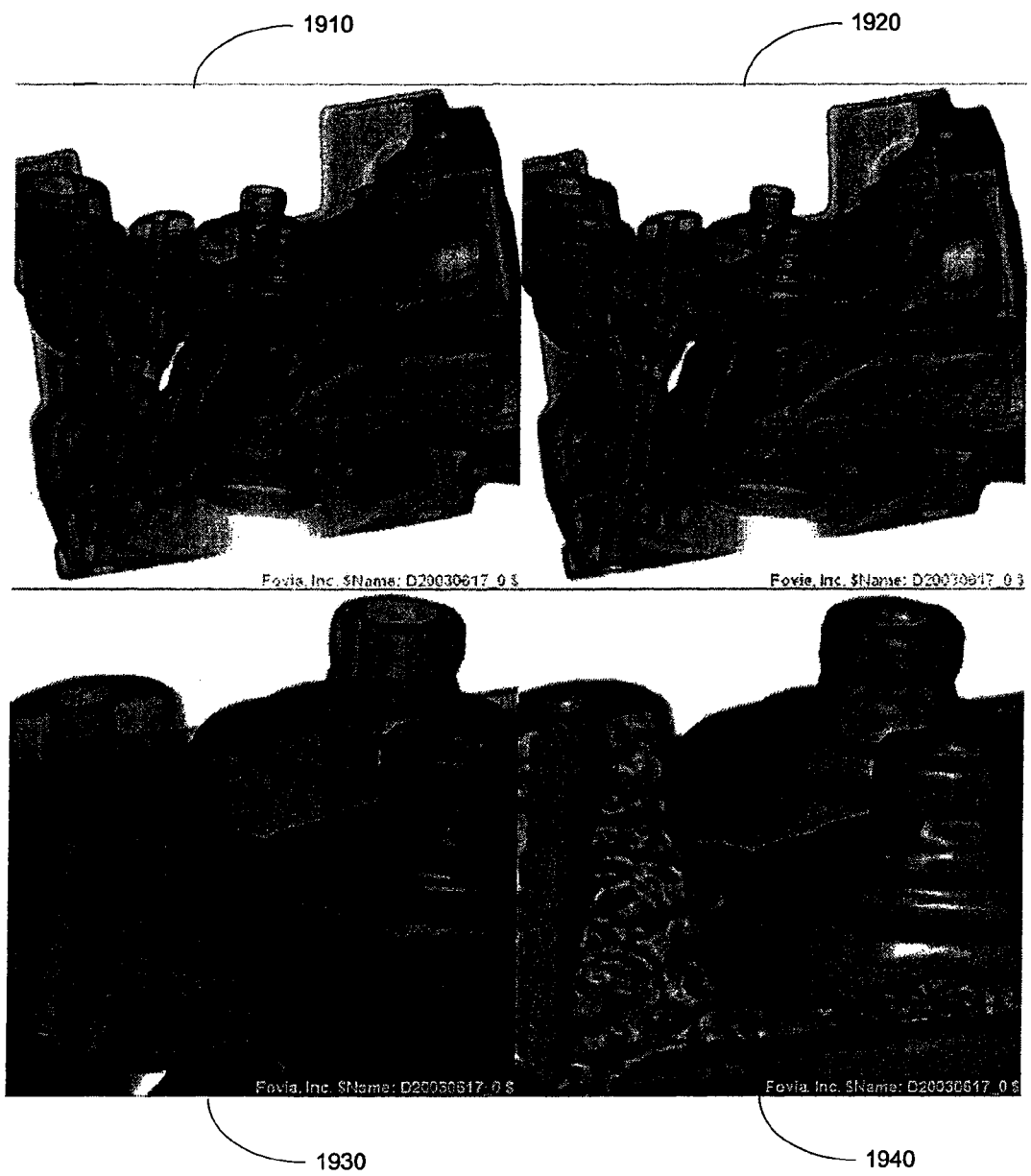
FIG. 19 depicts four images of an automobile engine when the system uses different opacity visualization parameters, e.g., different opacity transfer functions.
Figure 20:
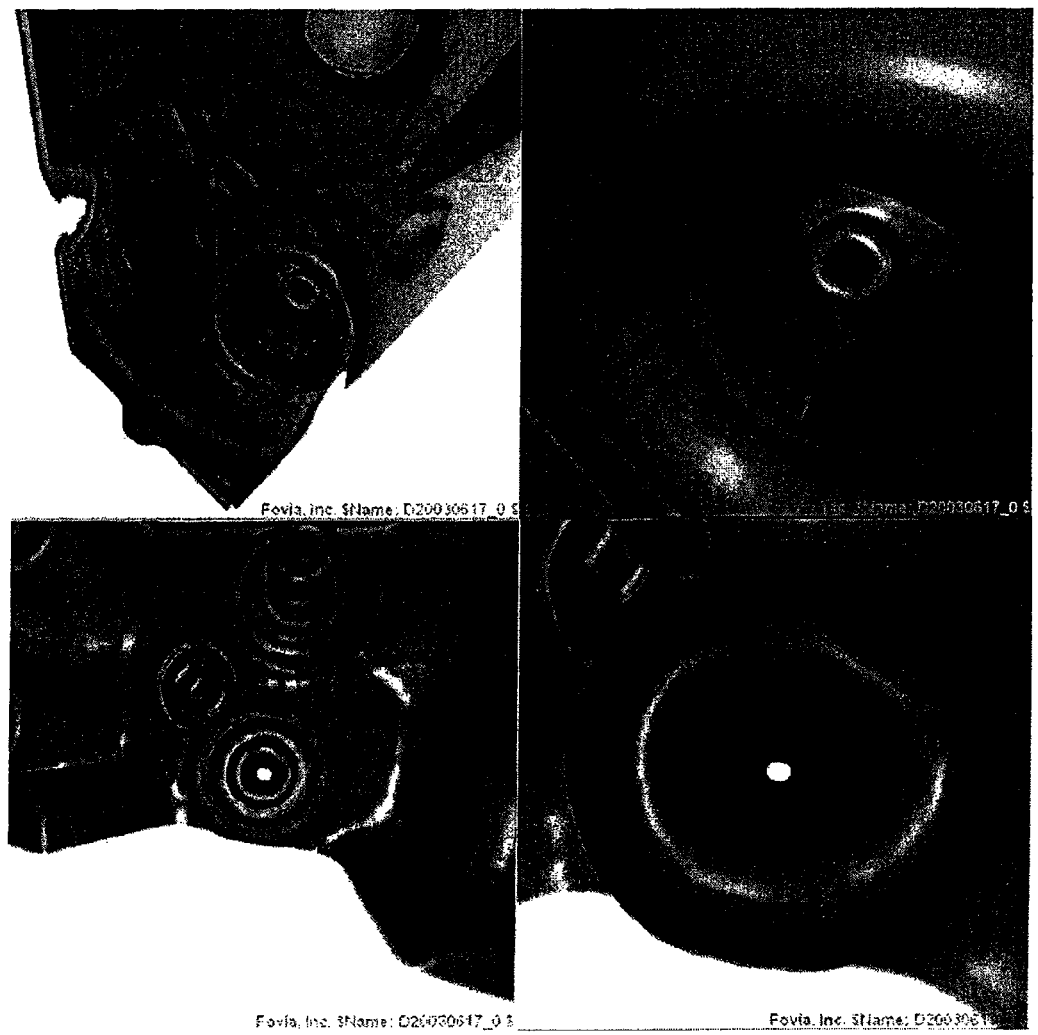
FIG. 20 depicts another four images of different parts of an automobile engine.

FIG. 19 depicts different parts of an engine. Images 1910 and 1920 are generated at the same location, but with slightly different visualization parameters. As a result, the engine in image 1910 looks more transparent that that in image 1920. This difference is more obvious between enlarged images 1930 and 1940. Finally, FIG. 20 is a set of images showing different components of the engine.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method of adaptive direct volume rendering, comprising:
    fragmenting a sampled 3-D dataset of a scalar field into a plurality of sub-volumes of different sizes, each sub-volume associated with a set of data value parameters characterizing the data value distribution of the scalar field within the sub-volume;
    defining an opacity transfer function that is dependent upon data values of the scalar field and an illumination model;
    selectively casting a plurality of rays from a 2-D image plane towards the sampled dataset using a computer processor, each ray having an initial ray energy and a cross-section;
    for each ray cast from a selected location on the 2-D image plane,
        selecting a subset of the plurality of sub-volumes for interaction with the ray;
        estimating the ray energy reflected by each sub-volume of the subset using the opacity transfer function and the illumination model; and
        summing the reflected ray energy as a pixel value at the selected location on the 2-D image plane; and
    estimating pixel values at other locations on the 2-D image plane using the pixel values at the selected locations
    wherein the step of estimating the ray energy reflected by each sub-volume of the subset includes;
        estimating a maximum energy differential of the sub-volume;
        comparing the maximum energy differential against a predefined energy error threshold;
        if the maximum energy differential is above the predefined energy error threshold, recursively
            selecting a smaller sub-volume along the ray path; and
            estimating a new maximum energy differential of the smaller sub-volume ; and
        if the maximum energy differential is below the predefined energy error threshold, calculating the amount of ray energy reflected by the sub-volume using the illumination model
    wherein if the sub-volume is a smallest sub-volume comprising 2×2×2 3-D cells, the smaller sub-volume is a 3-D cell within the smallest sub-volume, and if the opacity transfer function varies monotonically within the cell and an iso-surface exist in the 3-D cell, the maximum energy differential of the 3-D cell is calculated using the eight data values at the corners of the 3-D cell and the opacity transfer function.

2. The method of claim 1, wherein the maximum energy differential depends on the opacity transfer function and the maximum, average, and minimum data values of the sub-volume.

3. The method of claim 1, wherein the amount of ray energy reflected by the sub-volume depends on the length of ray path within the sub-volume, the opacity transfer function within the sub-volume the average scalar field value of the sub-volume, and the local gradient vector of scalar field within the sub-volume.

4. The method of claim 1, wherein if the sub-volume is a smallest sub-volume comprising 2×2×2 3-D cells, the smaller sub-volume is a 3-D cell within the smallest sub-volume, and if the opacity Function does not vary monotonically within the cell, the 3-D cell is further divided into multiple sub-cells until the dimension of a smallest sub-cell reaches the cross-section of the ray.

5. The method of claim 1, wherein if the sub-volume is a smallest sub-volume comprising 2×2×2 3-D cells, the smaller sub-volume is a 3-D cell within the smallest sub-volume, and if the opacity function varies monotonically within the cell, the maximum energy differential of the 3-D cell is estimated by dividing the maximum energy differential of the sub-volume by 2.

6. The method of claim 1, wherein the predefined energy error threshold is modulated by an image rendering speed specified by a user and a zoom factor in the case of parallel projection or a perspective angle and a perspective distance between the image plane and the 3-D dataset in the case of perspective projection.

7. A method of adaptive direct volume rendering, comprising:
    fragmenting a sampled 3-D dataset of a scalar field into a plurality of sub-volumes of different sizes, each sub-volume associated with a set of data value parameters characterizing the data value distribution of the scalar field within the sub-volume;
    defining an opacity transfer function that is dependent upon data values of the scalar field and an illumination model;
    selectively casting a plurality of rays from a 2-D image plane towards the sampled dataset using a computer processor, each ray having an initial ray energy and a cross-section; and
    for each ray cast from a selected location on the 2-D image plane,
        selecting a subset of the plurality of sub-volumes for interaction with the ray wherein the subset constitutes a largest sub-volume in which the optical transfer function is determined to vary monotonically between maximum and minimum data values;
        estimating the ray energy reflected by each sub-volume of the subset using the opacity transfer function and the illumination model; and summing the reflected ray energy as a pixel value at the selected location on the 2-D image plane.

8. The method of claim 7 wherein the step of selecting a subset of the plurality of sub-volumes for interacting with the ray includes:
identifying a largest sub-volume along the ray path and its corresponding maximum and minimum data values;
checking if the opacity transfer function varies monotonically between the maximum and minimum scalar field values;
if the function does not vary monotonically, recursively identifying a smaller sub-volume along the ray path and its corresponding maximum and minimum data values; and
checking if the opacity transfer function varies monotonically between the maximum and minimum scalar field values of the smaller sub-volume; and
if the function does vary monotonically, estimating the amount of ray energy reflected by the sub-volume during its interaction with the ray.

9. The method of claim 7, wherein two lookup tables are constructed for the opacity transfer function such that a forward lookup table contains the data value difference to a nearest local extreme of the opacity transfer function along the data value increasing direction and a backward lookup table contains the data value difference to a nearest local extreme of the opacity transfer function along the data value decreasing direction.

10. The method of claim 9, wherein if the maximum data value of the sub-volume is smaller than the summation of the minimum data value of the sub-volume and its corresponding data value difference stored in the forward lookup table or the minimum data value of the sub-volume is larger than the difference between the maximum data value of the sub-volume and its corresponding data value difference stored in the backward lookup table, the opacity transfer function varies monotonically between the minimum and maximum data values.

11. A method of adaptive direct volume rendering, comprising:
fragmenting a sampled 3-D dataset of a scalar field into a plurality of sub-volumes of different sizes, each sub-volume associated with a set of data value parameters characterizing the data value distribution of the scalar field within the sub-volume;
defining an opacity transfer function that is dependent upon data values of the scalar field and an illumination model; and
selectively casting a plurality of rays from a 2-D image plane towards the sampled dataset using a computer processor, each ray having an initial ray energy and a cross-section; and for each ray cast from a selected location on the 2-D image plane,
identifying a largest sub-volume along the ray path in which the optical transfer function varies monotonically between maximum and minimum data values;
estimating the ray energy reflected by the largest sub-volume using
the opacity transfer function and the illumination model; and
summing the reflected ray energy as a pixel value at the selected location on the 2-D image plane.

12. The method of claim 11 wherein the step of identifying the largest sub-volume along the ray path in which the optical transfer function varies monotonically includes:
identifying a largest sub-volume along the ray path and its corresponding maximum and minimum data values;
checking if the opacity transfer function varies monotonically between the maximum and minimum scalar field values;
if the function does not vary monotonically, recursively identifying a smaller sub-volume along the ray path and its corresponding maximum and minimum data values; and
checking if the opacity transfer function varies monotonically between the maximum and minimum scalar field values of the smaller sub-volume; and
if the function does vary monotonically, estimating the amount of ray energy reflected by the sub-volume during its interaction with the ray.

13. The method of claim 11, wherein two lookup tables are constructed for the opacity transfer function such that a forward lookup table contains the data value difference to a nearest local extreme of the opacity transfer function along the data value increasing direction and a backward lookup table contains the data value difference to a nearest local extreme of the opacity transfer function along the data value decreasing direction.

14. The method of claim 13, wherein if the maximum data value of the sub-volume is smaller than the summation of the minimum data value of the sub-volume and its corresponding data value difference stored in the forward lookup table or the minimum data value of the sub-volume is larger than the difference between the maximum data value of the sub-volume and its corresponding data value difference stored in the backward lookup table, the opacity transfer function varies monotonically between the minimum and maximum data values.

* * * * *